US 8,295,159 B2

(12) United States Patent
Maheshwari et al.

(10) Patent No.: US 8,295,159 B2
(45) Date of Patent: Oct. 23, 2012

(54) TIMER POLL RETRANSMISSION EXPIRY IN A WIRELESS COMMUNICATION SYSTEM

(75) Inventors: Shailesh Maheshwari, San Diego, CA (US); Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 12/687,082

(22) Filed: Jan. 13, 2010

(65) Prior Publication Data

US 2010/0177701 A1 Jul. 15, 2010

Related U.S. Application Data

(60) Provisional application No. 61/144,588, filed on Jan. 14, 2009.

(51) Int. Cl.
*G06F 11/00* (2006.01)
*H04J 3/16* (2006.01)
*H04L 12/403* (2006.01)
*H04L 1/00* (2006.01)

(52) U.S. Cl. ........ 370/216; 370/346; 370/394; 370/449; 714/2; 714/748

(58) Field of Classification Search ....... 370/229–236.2, 370/278, 282, 310.2, 313, 315, 328, 346, 370/348–349, 447–452; 375/220–222, 262–267, 375/350; 714/1–2, 47, 100, 748–749, 774–776, 714/798–801
See application file for complete search history.

(56) References Cited

U.S. PATENT DOCUMENTS

| 6,697,331 | B1 * | 2/2004 | Riihinen et al. | 370/236 |
| 7,069,490 | B2 * | 6/2006 | Niu et al. | 714/748 |
| 7,395,481 | B2 * | 7/2008 | Chintada et al. | 714/749 |
| 7,525,908 | B2 * | 4/2009 | Olsson et al. | 370/229 |
| 7,733,826 | B2 * | 6/2010 | Jiang | 370/328 |
| 7,936,735 | B2 * | 5/2011 | Obuchi et al. | 370/338 |
| 7,974,259 | B2 * | 7/2011 | Jiang | 370/346 |
| 8,000,256 | B2 * | 8/2011 | Cha et al. | 370/252 |
| 8,134,993 | B2 * | 3/2012 | Jiang | 370/346 |
| 2004/0187068 | A1 * | 9/2004 | Chintada et al. | 714/776 |
| 2008/0225824 | A1 | 9/2008 | Meylan et al. | |

FOREIGN PATENT DOCUMENTS

EP 1871031 A2 12/2007
WO WO0137473 A1 5/2001

OTHER PUBLICATIONS

International Search Report and Written Opinion—PCT/US2010/021053,International Search Authority—European Patent Office—Jun. 24, 2010.

* cited by examiner

*Primary Examiner* — Tri H Phan
(74) *Attorney, Agent, or Firm* — John J. Ketchum

(57) ABSTRACT

Providing for improved acknowledgment and retransmission protocols for wireless communication is described herein. By way of example, the acknowledgment and retransmission protocols can comprise including a poll element, or reply command, within a data unit that is part of a wireless transmission. A timer is set following sending the wireless transmission, and if a reply is not received within expiration of the timer, retransmission is triggered. According to specific aspects, retransmission comprises resending the data unit that includes the poll element or reply command. In this manner, redundant retransmission can be mitigated, whether because a receiver fails to successfully receive one or more subsets of the wireless transmission, or because the transmitter fails to obtain a reply to the wireless transmission.

45 Claims, 15 Drawing Sheets

TIMER POLL RETRANSMISSION EXPIRY IN A WIRELESS COMMUNICATION SYSTEM

CLAIM OF PRIORITY UNDER 35 U.S.C §119

The present Application for Patent claims priority to Provisional Patent Application Ser. No. 61/144,588 entitled "A METHOD AND APPARATUS FOR HANDLING RLC TIMER POLL RETRANSMISSION EXPIRY IN A WIRELESS COMMUNICATION SYSTEM" filed Jan. 14, 2009, and assigned to the assignee hereof and hereby expressly incorporated by reference herein.

BACKGROUND

1. Field

The following description relates generally to wireless communications, and more particularly to facilitating acknowledgment and retransmission of wireless data in a wireless communication system.

2. Background

Wireless communication systems are widely deployed to provide various types of communication content, such as voice content, data content, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), or multi-carrier wireless specifications such as evolution data optimized (EV-DO), one or more revisions thereof, etc.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

For wireless communication in general, signal timing is an important aspect of successful transmission and reception of data. Wireless signals are generally divided in time into multiple time frames, comprising multiple time subframes. In some wireless systems, time frames can be designated for uplink (UL) transmission or downlink (DL) transmission. Alternatively, or in addition, various frequency bands or code spreads can be designated for UL transmission or DL transmission as well. This provides an overt mechanism to distinguish UL and DL transmission sequences, whether by turn-based time subframes, or by orthogonal frequency bands or code spreads, to mitigate interference. Furthermore, accurate timing is an important part of successfully demapping and demodulating a wireless signal; without knowing what symbols to expect at a particular time, proper wireless reception can be difficult or impossible, depending on circumstances.

Another common aspect of wireless communication is acknowledgment and retransmission protocols between wireless receivers and wireless transmitters, respectively. Acknowledgment involves a receiver conveying to a transmitter that particular data packets have been received successfully, or that particular packets have not been received successfully. In turn, the transmitter can then retransmit packets lost by the receiver, or proceed to another sequence of transmissions if a previous sequence is successfully received at the receiver. In this manner the transmitter and receiver can reliably exchange information, even in adverse wireless conditions (e.g., with high packet loss).

Although explicit acknowledgment of received and lost data can provide highly reliable wireless data exchange, competing aspects of wireless communication exist that limit full explicit acknowledgments. For instance, to maximize wireless resources and bandwidth, protocol schemes are often derived to approximate various wireless communication functions at lower bandwidth cost. Acknowledgment and retransmission is no exception to this concept. Accordingly, many acknowledgment and retransmission protocols do not explicitly identify all lost packets, but rather employ coding protocols that can be utilized to infer identity of lost packets, with minimal wireless resources. Although generally effective, these coding protocols can lead to errors, duplicate transmission of data packets, or failed retransmission of lost packets. Thus, one aspect of existing protocol engineering is minimizing these errors without significantly impacting radio link control bandwidth.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the subject disclosure in a simplified form as a prelude to the more detailed description that is presented later.

The subject disclosure provides for improved acknowledgment and retransmission protocols for wireless communication. According to some aspects disclosed herein, the acknowledgment and retransmission protocols can comprise radio link control (RLC) timer poll retransmission expiry. Particularly, the protocols can comprise including a poll element, or reply command, in a data unit that is part of a wireless transmission. A timer is sent following sending the wireless transmission, and if a reply is not received within expiration of the timer, retransmission is triggered. According to specific aspects of the subject disclosure, retransmission comprises resending the data unit that includes the poll element or reply command. In this manner, redundant retransmission can be mitigated, whether because a receiver fails to successfully receive one or more subsets of the wireless transmission, or because the transmitter fails to obtain a reply to the wireless transmission.

In one or more other aspects a method for wireless communication is provided. The method can comprise employing a wireless transmitter to transmit a set of wireless data, wherein a subset of the wireless data comprises a poll element that instructs a receiver to transmit a response to the set of wireless data. Furthermore, the method can comprise employing a data processor to initiate a timer upon transmitting the set of wireless data. In addition, the method can comprise employing the wireless transmitter to retransmit the subset of the wireless data that comprises the poll element if the response is not received by expiration of the timer.

In additional aspects, an apparatus for wireless communication is proved. The apparatus can comprise a wireless transceiver for sending and receiving wireless data. Further, the apparatus can comprise memory for storing control protocols for acknowledgment (ACK) and retransmission of wireless data. Further still, the apparatus can comprise a data processor for executing modules that implement the control protocols. Specifically, these modules can comprise an analysis module that identifies a set of transmitted data associated with a negative acknowledgment (a set of NACKed data). The modules can also comprise an acknowledgment module (an ACK module) that includes a reply command with a subset of the set of NACKed data and that employs the wireless transceiver to retransmit the set of NACKed data, and a response module that retransmits the subset of the set of NACKed data if a default time expires before receiving a response to retransmission of the set of NACKed data.

According to still other aspects of the subject disclosure, an apparatus for wireless communication is provided. The apparatus can comprise means for employing a wireless transmitter to transmit a set of wireless data, wherein a subset of the wireless data comprises a poll element that instructs a receiver to transmit a response to the set of wireless data. Moreover, the apparatus can comprise means for employing a data processor to initiate a timer upon transmitting the set of wireless data. The apparatus can additionally comprise means for employing the wireless transmitter to retransmit the subset of the wireless data that comprises the poll element if the response is not received by expiration of the timer.

According to at least one additional aspect, provided is at least one processor for wireless communication. The processor(s) can comprise a module that transmits a set of wireless data, wherein a subset of the wireless data comprises a poll element that instructs a receiver to transmit a response to the set of wireless data. The processor(s) can also comprise a module that initiates a timer upon transmitting the set of wireless data. In addition to the foregoing, the processor(s) can comprise a module that retransmits the subset of the wireless data that comprises the poll element if the response is not received by expiration of the timer.

In still other aspects the subject disclosure provides a computer program product comprising a computer-readable medium. The computer-readable medium can comprise code for causing a computer to transmit a set of wireless data, wherein a subset of the wireless data comprises a poll element that instructs a receiver to transmit a response to the set of wireless data. In addition, the computer-readable medium can comprise code for causing the computer to initiate a timer upon transmitting the set of wireless data. Moreover, the computer-readable medium can also comprise code for causing the computer to retransmit the subset of the wireless data that comprises the poll element if the response is not received by expiration of the timer.

Further to the above, the subject disclosure provides a method of receiving wireless communication. The method can comprise employing a wireless transceiver to obtain a stream of data comprising a data unit having a most recent reply command for the stream of data. Further, the method can comprise employing a data processor to parse the stream of data and to identify a set of missing data and employing the wireless transceiver to send a negative acknowledgment (NACK) for the set of missing data. In addition to the foregoing, the method can comprise employing the wireless transceiver to obtain a retransmission of the data unit having the most recent reply command.

Additional aspects of the subject disclosure provide an apparatus for receiving wireless communication. The apparatus can comprise a wireless transceiver for sending and receiving a stream of data. The apparatus can further comprise memory for storing wireless protocols for acknowledgment of the stream of data. Moreover, the apparatus can comprise a data processor for executing modules configured to implement the wireless protocols. Particularly, the modules can comprise a parsing module for analyzing the stream of data and identifying whether a subset of the stream of data is missing, wherein the stream of data comprises a data unit having a most recent reply command for the stream of data. In addition, the modules can comprise a response module for sending a negative acknowledgment (a NACK) if the subset of the stream of data is missing, or an acknowledgment (an ACK) if the subset of the stream of data is not missing. Furthermore, the modules can also comprise a receiver module that obtains a retransmission of the data unit having the most recent reply command.

In one or more further aspects, disclosed is an apparatus for receiving wireless communication. The apparatus can comprise means for employing a wireless transceiver to obtain a stream of data comprising a data unit having a most recent reply command for the stream of data. Further, the apparatus can comprise means for employing a data processor to parse the stream of data and to identify whether a subset of the set of data is missing. Further still, the apparatus can comprise means for employing the wireless transceiver to send a negative acknowledgment or an acknowledgment if the subset of the set of data is missing or not missing, respectively. In addition to the foregoing, the apparatus can comprise means for employing the wireless transceiver to obtain a retransmission of the data unit having the most recent reply command.

In other disclosed aspects, provided is at least one processor configured for receiving wireless communication. The processor(s) can comprise a module that obtains a stream of data comprising a data unit having a most recent reply command for the stream of data. Further, the processor(s) can comprise a module that parses the stream of data and to identify whether a subset of the set of data is missing. Further still, the processor(s) can comprise a module that sends a negative acknowledgment or an acknowledgment if the subset of the set of data is missing or not missing, respectively. Additionally, the processor(s) can comprise a module that obtains a retransmission of the data unit having the most recent reply command.

According to at least one additional aspect, the subject disclosure provides a computer program product comprising a computer-readable medium. The computer-readable medium can comprise code for causing a computer to obtain a stream of data comprising a data unit having a most recent reply command for the stream of data. Moreover, the computer-readable medium can comprise code for causing the computer to parse the stream of data and to identify whether a subset of the set of data is missing. In addition, the computer-readable medium can comprise code for causing the computer to send a negative acknowledgment or an acknowledgment if the subset of the set of data is missing or not missing, respectively. Further still, the computer-readable medium can comprise code for causing the computer to obtain a retransmission of the data unit having the most recent reply command.

According to at least one further aspect, the subject disclosure describes a computer program product comprising a computer-readable medium. The computer-readable medium can comprise code for causing a computer to obtain timing information pertaining to a non-serving frequency of a wireless network. Moreover, the computer-readable medium can comprise code for causing the computer to inspect the timing information to identify subframe configuration data pertaining to the non-serving frequency. In addition to the foregoing, the computer-readable medium can comprise code for causing the computer to employ a subframe configuration utilized by network cells on the non-serving frequency for analyzing signals thereof.

DETAILED DESCRIPTION

Figure 1:
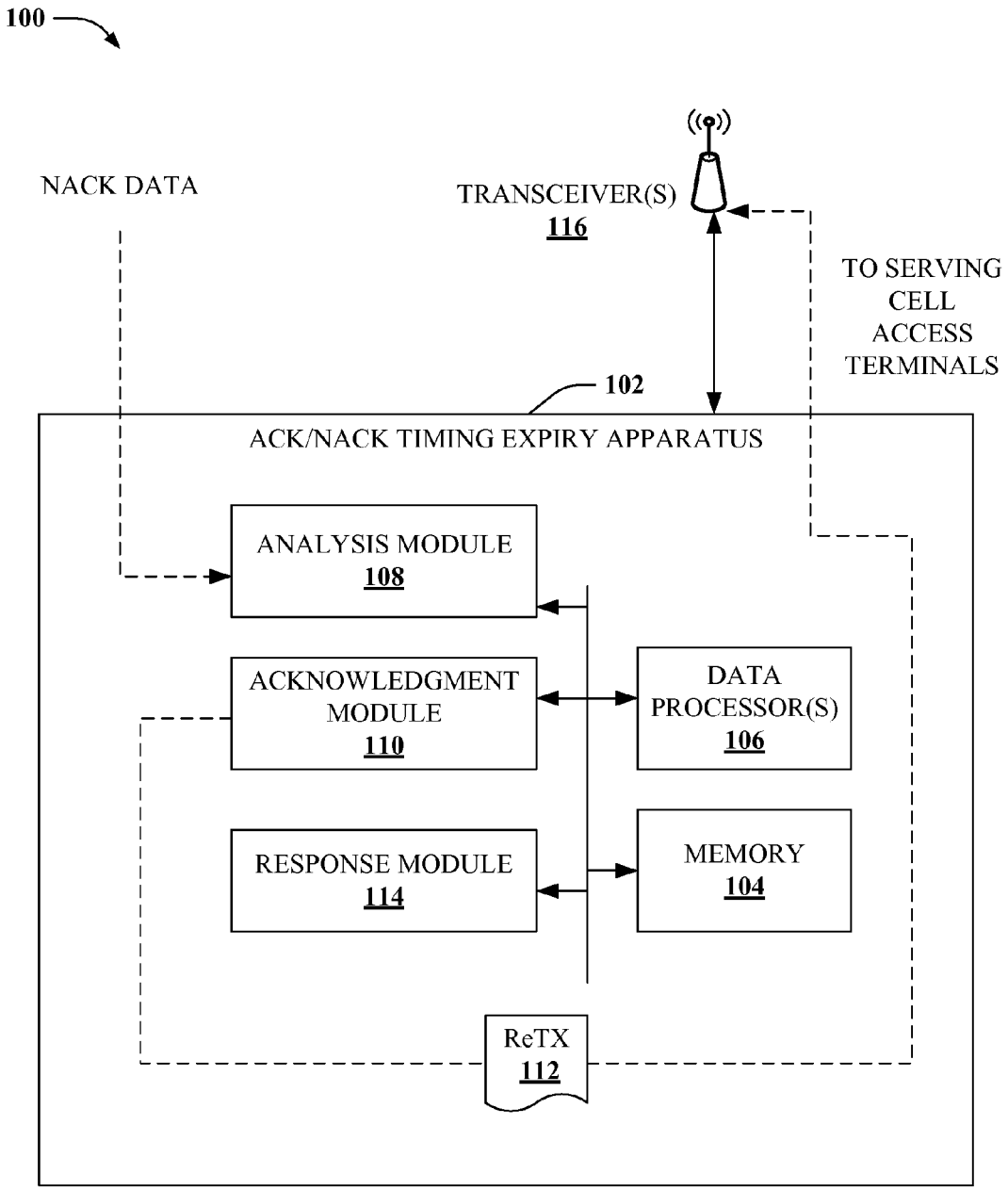
FIG. 1 illustrates a block diagram of an example acknowledgment (ACK) negative acknowledgment (NACK) timing expiry apparatus.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of providing retransmit poll timer expiry in wireless communication. One skilled in the art should appreciate that similar techniques could apply to other communication environments.

Wireless communication systems achieve electronic communication between remotely located wireless nodes through local infrastructure deployments and central networks that communicatively couple local infrastructure (e.g., a base station). In general, the local infrastructure can utilize various principles to exchange wireless information with these nodes. But each case depends on establishing a wireless link between a transmitter of the wireless node and a receiver of the local infrastructure or base station, and vice versa. Typically, the wireless link involves a transmitter-receiver pair coordinating a set of orthogonal wireless resources (e.g., frequency subband, time subslot, code-spread factor, and so on), employed by the wireless node and local infrastructure. By transmitting or decoding signals only on the set of orthogonal wireless resources, data transmitted on one wireless link (set of resources employed by a transmitter-receiver pair) can be distinguished from data transmitted on other wireless links (sets of resources employed by other transmitter-receiver pairs). Furthermore, each transmitter-receiver pair employing a distinct wireless link forms a distinct spatial channel, also referred to as a wireless channel, or signal dimension.

One common protocol employed in wireless communication is radio link protocol (RLP) or radio link control (RLC) protocol, which provides automatic repeat request (ARQ) procedures or hybrid ARQ (HARQ) procedures over a wireless air interface. In general, wireless air interfaces are tuned to provide about one percent packet loss. However, one percent packet loss can be intolerable to certain types of data transmission, including transport control protocol (TCP) employed for Internet Protocol (IP) communications (e.g., with TCP/IP protocol). In addition, high quality of service transmissions such as voice over IP (VoIP) may suffer significant degradation at one percent packet loss. RLC is configured to further reduce packet loss significantly over these general air interface protocols. For instance, RLC can be configured to detect packet loss at a receiver and implement retransmission of lost data to reduce packet loss to 0.01% or lower, which is generally suitable for TCP/IP applications.

A typical RLC protocol is acknowledgment (ACK) based or negative acknowledgment (NACK) based, or a suitable combination thereof. For NACK based protocols, a transmitter assumes that all data units are successfully received unless a NACK is provided to the transmitter. This can greatly reduce reverse-link transmissions (e.g., uplink NACK for downlink transmissions, or downlink NACK for uplink transmissions), which can often be spectrally inefficient in many modern wireless communication networks (e.g., a cellular communication network). When a transmit queue is empty of data units to be transmitted, a NACK based RLC often retransmits the most recently transmitted data units, in case this last data unit was lost by a receiver. This duplicate transmission can be redundant, however, when the last data unit is successfully received. In such case, the redundant transmission utilizes bandwidth needlessly. According to aspects of the subject disclosure, this redundant transmission can be mitigated in particular circumstances, by setting a poll timer upon completing a transmission, and resending a last polled data unit if a NACK or ACK is not received upon expiration of the poll timer, rather than the last data unit in the transmission. In such case, a greater likelihood of retransmitting a lost data unit is achieved, mitigating redundancy and reducing bandwidth utilization.

Turning now to the figures, FIG. 1 illustrates a block diagram of an example wireless apparatus 100 according to aspects of the subject disclosure. Wireless apparatus 100 comprises an ACK/NACK timing expiry apparatus 102 communicatively coupled with one or more wireless transceivers 116. In one aspect of the subject disclosure, the wireless transceiver(s) 116 can be physically connected to ACK/NACK timing expiry apparatus 102, for instance on a single physical communication device. An example of this aspect could be a mobile handset comprising ACK/NACK timing expiry apparatus 102 (e.g., see FIG. 6, infra). Another example could comprise a network base station that includes ACK/NACK timing expiry apparatus 102 and wireless transceiver(s) 116 (e.g., see FIG. 5, infra). In an alternative aspect, wireless transceiver(s) 116 can be remotely located from ACK/NACK timing expiry apparatus 102. For instance, in this latter aspect ACK/NACK timing expiry apparatus 102 can be included as part of a central base station controller (BSC—not depicted), or physically coupled with (or, e.g., stored as software/firmware on) the BSC (e.g., see FIG. 14, infra, at 1430 and 1410).

Figure 2:
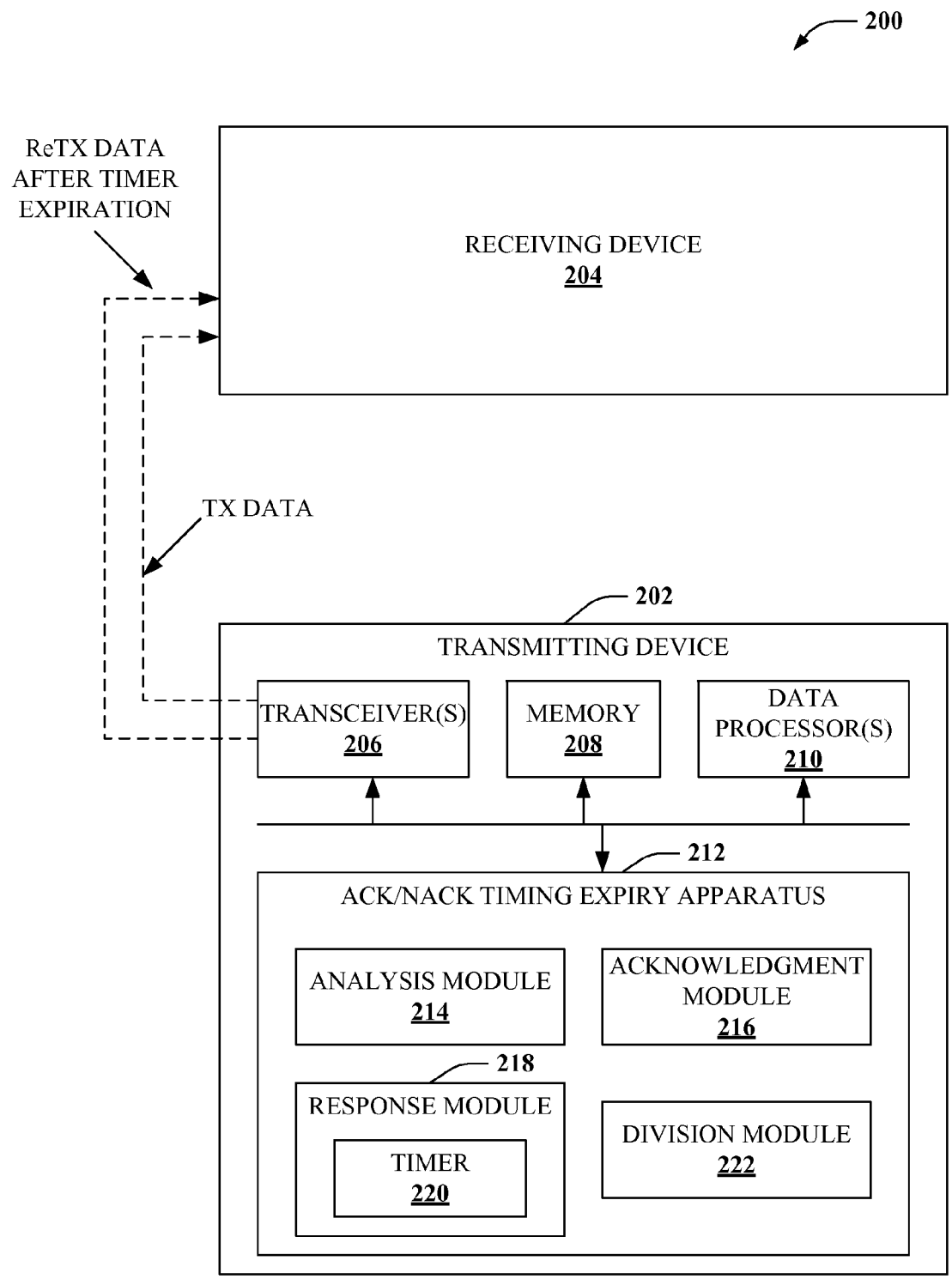
FIG. 2 illustrates a block diagram of example ACK/NACK timing expiry in wireless communication according to further aspects of the subject disclosure.
Figure 3:
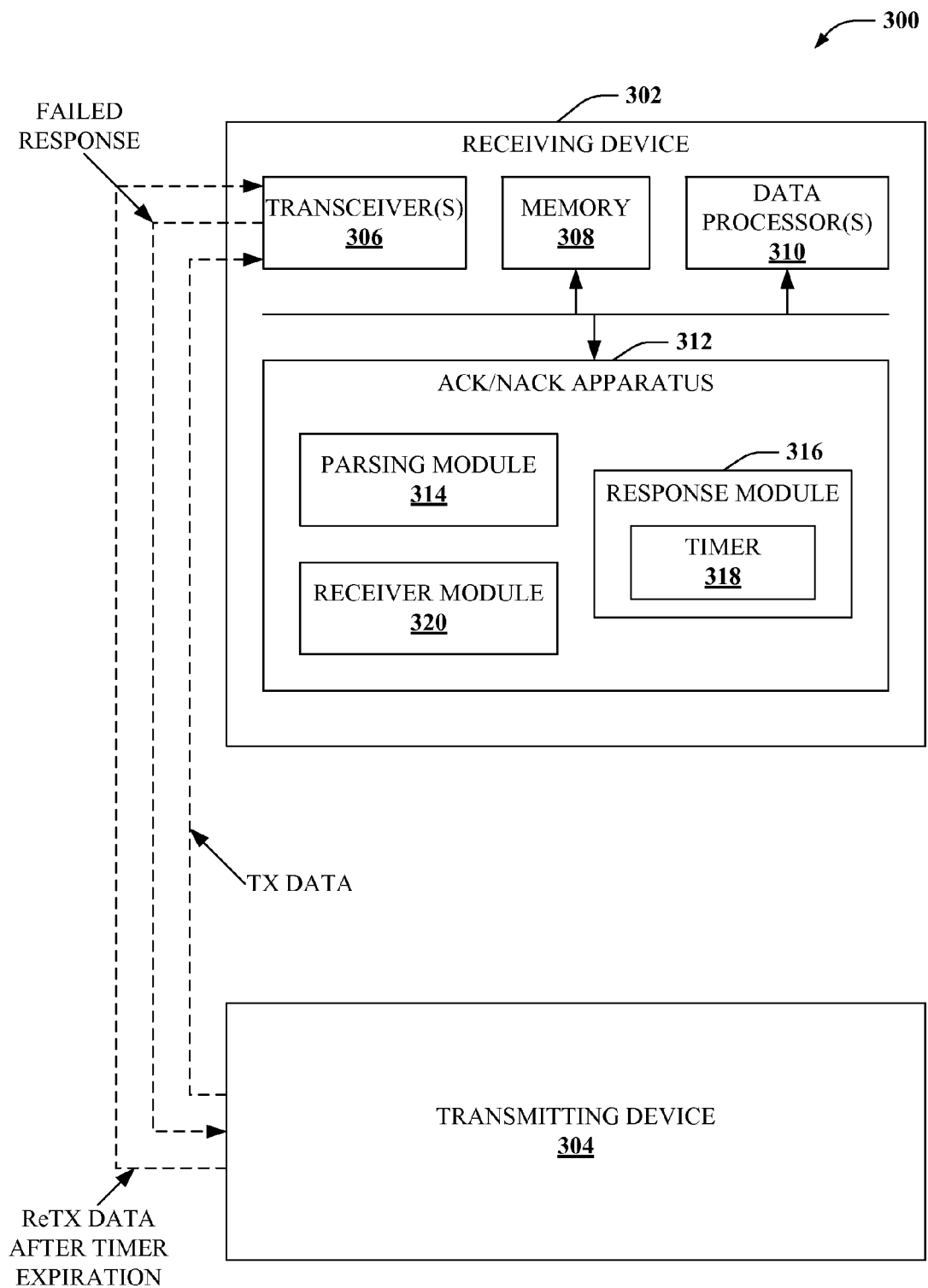
FIG. 3 depicts a block diagram of sample ACK/NACK timing expiry in wireless communication according to still other aspects of the subject disclosure.

In basic operation, ACK/NACK timing expiry apparatus 102 can employ wireless transceiver(s) 116 to exchange data with a remote communication device (not depicted, but see FIGS. 2 and 3, infra). Specifically, ACK/NACK timing expiry apparatus can comprise memory 104 for storing control protocols for implementing ACK/NACK and retransmission of wireless data. These control protocols can be configured to instruct the remote communication device to respond upon receiving a wireless transmission sent by wireless transceiver(s) 116. The control protocols can further specify the form and content of this response, including whether to ACK received data, NACK un-received data, or a suitable combination thereof (e.g., NACK missing data units, and ACK a subsequent transmission data unit). Form and content can further specify whether to identify missing data units by sequence number, and identify a subsequent data unit for transmission. As a specific example, consider a transmission comprising twenty (20) protocol data units (PDUs) numbered 0, 1, 2, . . . , 19. A transmitter (e.g., wireless transceiver(s) 116) transmitting these PDUs can include a poll element, or poll bit (which can also be referred to as a reply command, or single bit poll, multi-bit poll, multi-bit reply command, or the like) with one or more of the PDUs. In RLC, for instance, the poll element is sent with a PDU having a highest sequence number of the PDUs—in this case PDU 19. Typical conventional protocols require re-transmission of the most recently transmitted PDU (PDU 19 if the transmission is sent in numerical order) where a response to a poll element is not received within a timer expiry period, or when a transmission or retransmission buffer is full, or for other suitable reasons consistent with a particular control protocol. This can lead to redundant transmission of the most recent PDU. Also, if a different PDU is actually not received by the receiving device, re-transmitting the most recently transmitted PDU does not provide the un-received PDU; it is, in fact, a wasted transmission.

In another example of control protocols, consider the transmission sequence of 20 PDUs numbered 0, 1, 2, . . . , 19 introduced above. Wireless transceiver(s) 116 sends the transmission sequence, and a receiving device receives all PDUs except for PDUs 7, 8, 10 and 11. One example response according to control protocols stored in memory 104 (and stored at the receiving device) could comprise NACK 7, 8, 10, 11 ACK 20, indicating PDUs 7, 8, 10 and 11 have not been received, and the next anticipated PDU is PDU 20 (implying that PDU 19 is the most recently received PDU as well). In this case, conventional protocols (e.g., radio link protocol [RLP] or radio link control [RLC] protocol) require a transmitting device to re-transmit data units 7, 8, 10 and 11, and send a subsequent poll element (or poll bit, or a multi-bit element) with data unit 11, instructing the receiving device to again respond to this retransmission. However, if a timer poll expires without wireless transceiver(s) 116 receiving a response to the re-transmission, conventional protocols would require re-transmission of the last PDU in the transmission sequence, which is PDU 19. This would clearly be a redundant transmission, as PDU 19 is already received by the receiving device. In addition, re-transmitting PDU 19 fails to correct the loss of PDUs 7, 8, 10 and 11. This is one problem addressed by ACK/NACK timing expiry apparatus 102, as discussed in more detail below.

ACK/NACK timing expiry apparatus 102 can comprise a data processor 106 for executing modules that implement the control protocols stored in memory 104. Particularly, these modules can comprise an analysis module 108 that identifies a set of transmitted data associated with a negative acknowledgment (also referred to as a set of NACKed data). Referencing the above example, the set of NACKed data can comprise PDUs 7, 8, 10 and 11, which were indicated as lost by the receiving device. Further, the modules can comprise an acknowledgment module (or ACK module) 110 that includes a reply command (e.g., poll element, poll bit, . . . ) with a subset of the set of NACKed data 112 and that employs wireless transceiver(s) 116 to re-transmit the set of NACKed data. Continuing the foregoing example, the subset of the set of NACKed data 112 can comprise a particular PDU of the set of PDUs 7, 8, 10 and 11, or a subset of the set of PDUs. As one particular example, ACK module 110 includes the reply command with one of the set of PDUs having a highest sequence number of the set of transmitted PDUs (e.g., PDU 11, or in general, a PDU having a highest sequence number within a most recent data transmission or re-transmission on a radio bearer supporting the set of wireless data being conveyed). In general, the reply command can be configured to instruct a receiving device to ACK or NACK re-transmission of the set of NACKed data. However, various aspects of the subject disclosure provide different reply command formats, as discussed below.

In one aspect of the subject disclosure, the reply command is a single bit command. This single bit command can specify, for instance, reply is required, or reply is not required. When, in the subject disclosure, the reply command (or poll bit, poll element, etc.) is included with or within a PDU, then the reply is required. In another aspect of the subject disclosure, the reply command can be a multi-bit command. In this aspect, the reply command can specify information in addition to reply/no reply, such as form of the reply, timing for the reply, content of the reply, or the like, or a suitable combination thereof.

Further to the above, ACK/NACK timing expiry apparatus 102 can comprise a response module 114 that re-transmits the subset of the set of NACKed data 112 if a default time expires before receiving a response to re-transmission of the set of NACKed data. Re-transmitting the subset of the set of NACKed data 112 that comprises the reply command is more efficient and reliable than conventional protocols that require re-transmission of the last PDU in a transmission sequence. As discussed above, the conventional protocols often lead to redundant re-transmission, unless by some chance the last PDU in the transmission sequence happens to be lost by the receiving device. However, generally speaking there is no greater likelihood for this PDU to be lost than any other PDU (absent particular conditions to the contrary), rendering re-transmission of the last PDU statistically redundant. On the other hand, if a response to transmission of the set of NACKed data is not received within expiration of the default time, it is most likely because either the receiving device failed to receive the subset of the set of NACKed data 112 that comprises the reply command (e.g., PDU 11 in the above example), or the response to transmission of the set of NACKed data was lost by wireless transceiver(s) 116. In the latter case, little can be done on the part of the wireless transceiver(s) 116. However, in the former case, re-transmitting the subset of the set of NACKed data 112 comprising the reply command not only alleviates the redundancy of retransmitting a received PDU, it also provides the missing data to the receiving device. Accordingly, ACK/NACK timing expiry apparatus 102 provides a significant advantage over conventional apparatuses that employ conventional control protocols. For instance, redundant ARQ or HARQ transmissions can be mitigated, while improving bandwidth utilization for wireless transceiver(s) 116.

FIG. 2 illustrates a block diagram of an example wireless communication system 200 according to further aspects of the subject disclosure. Wireless communication system 200 can comprise a transmitting device 202 communicatively coupled with a receiving device 204. Particularly, the transmitting device can comprise one or more wireless transceiver(s) 206 for sending and receiving wireless data to and from, respectively, receiving device 204. Although not depicted, receiving device also comprises one or more wireless transceivers as well (e.g., see FIG. 3, infra). Furthermore, transmitting device 202 comprises memory 208 for storing control protocols (e.g., RLP, RLC, . . . ) for managing acknowledgment and retransmission of data sent by transmitting device 202 to receiving device 204. In at least one aspect of the subject disclosure, the control protocols can be configured for a particular type of wireless communication system (e.g., a particular cellular system). Examples can include a third generation partnership project (3GPP) long term evolution (LTE) system, a 3GPP LTE advanced (LTE-A) system, a universal mobile telecommunication system (UMTS), or a high speed packet access (HSPA) system, a worldwide interoperability for microwave access (WiMAX) system, or another suitable wireless communication system, or a suitable combination thereof.

Control protocols stored in memory 208 can be implemented by a data processor 210 that executes an ACK/NACK timing expiry apparatus 212. Particularly, ACK/NACK timing expiry apparatus 212 can be configured to implement the control protocols for managing acknowledgment and retransmission of the data sent by transmitting device 202. In one aspect of the subject disclosure, ACK/NACK timing expiry apparatus 212 can be substantially similar to ACK/NACK timing expiry apparatus 102 of FIG. 1, supra, except where indicated otherwise. However, the subject disclosure is not so limited. For instance, ACK/NACK timing expiry apparatus 212 can comprise different modules for implementing the control protocols, a different arrangement of such modules, or combinations of such modules providing aggregate functionality, or the like. Other variations of ACK/NACK timing expiry apparatus contemplated by one of ordinary skill in the art by way of the context provided herein are also considered within the scope of the subject disclosure.

In operation, wireless transceiver(s) 206 can transmit wireless data to receiving device 204, labeled TX data (or transmit data), in FIG. 2. This wireless data can comprise a reply command, or poll bit, included by an ACK module 216. Particularly, ACK module 216 can include the reply command with a subset of the wireless data (e.g., one or more PDUs of a sequence of PDUs). Upon transmission of the wireless data, a response module 218 can set a timer 220 to a default time associated with response to the reply command. This default time can be established by the control protocols stored in memory 208 in one aspect of the subject disclosure, or can be specified within or inferred from the reply command in alternative aspects. Analysis module 214 can monitor data obtained by transmitting device 202 to identify whether the response to the reply command is received. If so, response module 218 can reply to this response as required by the control protocols stored in memory 208. In one aspect, this might entail re-transmitting NACKed data, with a subsequent reply command included in the re-transmitted data by ACK module 216. In another aspect, this might entail transmitting subsequent wireless data, for instance if all wireless data previously sent is ACKed in the response to the reply command. Other suitable replies to the response can be implemented as well; the subject disclosure is not limited to the foregoing examples.

On the other hand, if the default time expires before receiving the response to the transmission (or, e.g., the re-transmission of the NACKed data), response module 218 re-transmits the subset of the wireless data comprising the reply command. Response module 218 can again set timer 220 to the default time (or another suitable time set for a second transmitted reply command set by the control protocols) and await the response. Re-transmission of the subject of the wireless data and the reply command instructs receiving device 204 to again acknowledge the wireless data. Accordingly, if any data units are lost, they can be sent in the acknowledgment, and these lost data units can be re-transmitted by ACK/NACK timing expiry apparatus 212. Further, since no response was received by receiving device 204 in the default time, an increased likelihood exists that the subset of the wireless data comprising the reply command was lost by receiving device 204. Accordingly, defaulting to re-transmission of this subset of the wireless data increases a likelihood of re-transmitting lost data, as well as avoiding redundant transmissions.

In at least one aspect of the subject disclosure, ACK/NACK timing expiry apparatus 212 can comprise a division module 222 for breaking up the wireless data into smaller portions. This can be useful, for instance, where wireless conditions require transmission of smaller data segments for reliability, or where network protocols require reduced HARQ or ARQ traffic, or the like. Accordingly, in the context of the example described above, division module 222 segments at least a subset of the wireless data (e.g., one or more PDUs) into a plurality of sub-PDU segments. Furthermore, ACK module 216 includes the reply command into one of the sub-PDU segments, to instruct receiving device 204 to acknowledge the transmission of the sub-PDU segments. In one particular aspect, division module 222 can also provide suitable sequence numbering for the sub-PDU segments, for identification and ordering purposes, as required by control protocols stored in memory 208. Further, if expiration of a default time set by response module 218 on timer 220 expires before receiving a response to the reply command, response module 218 retransmits the one of the sub-PDU segments that includes the reply command. In this way, significantly reduced bandwidth can be provided by re-transmitting the sub-PDU segment, rather than an entire PDU or set of PDUs, for instance. Accordingly, ACK/NACK timing expiry module 212 can employ division module 222 to further reduce control channel utilization, and further improve wireless communications as a result.

FIG. 3 illustrates a block diagram of another wireless communication system 300 according to still other aspects of the subject disclosure. Wireless communication system 300 can comprise a receiving device 302 sharing a wireless communication link with a transmitting device 304. In certain aspects of the subject disclosure, wireless communication system 300 can be substantially similar to wireless communication system 200 of FIG. 2, supra. As an example, in one or more such aspects, receiving device 302 can be substantially similar to receiving device 204, or transmitting device 304 can be substantially similar to transmitting device 202, or both. The subject disclosure is not so limited, however, and in other aspects wireless communication system 300 can be substantially different from wireless communication system 300, in form (e.g., arrangement of modules, apparatuses, transmitting/receiving devices, and so on), or in substance (e.g., composition of apparatuses, modules, control protocols, and so on).

In operation, wireless data exchange between transmitting device 304 and receiving device 302 can be conducted per the following example. Transmitting device 304 can send a stream of data to receiving device 302 (indicated by TX data in FIG. 3). Further, this stream of data can include a data unit that comprises a most recent reply command for the stream of data—wherein the reply command instructs receiving device 302 to submit a response to the stream of data. This stream of data can be received at one or more wireless transceiver(s) 306 of receiving device 302, in whole, in part, or not at all. If the stream of data is not received by receiving device 302, then receiving device 302 fails to respond (indicated by failed response in FIG. 3) to the most recent reply command. Furthermore, it should be appreciated that if the set of wireless data is received at wireless transceiver(s) 306 in part, but the data unit comprising the most recent reply command is not received, a failed response can also occur. In such case, transmitting device 304 re-transmits the data unit comprising the most recent reply command (or a second reply command or a subsequent reply command), as described herein. In one aspect, where the stream of data comprises a sequence of PDUs, the re-transmission can comprise a subset of the PDUs in which the reply command was originally transmitted. In another aspect, where the set of wireless data comprises a sequence of sub-PDU segments, the re-transmission can comprise one of the sub-PDU segments in which the reply command was originally transmitted. According to one or more particular aspects, the subset of the PDUs or the one of the sub-PDU segments can comprise a PDU or a sub-PDU segment having a highest sequence order of the sequence of PDUs or the sub-PDU segments, respectively.

Where wireless transceiver(s) 306 does successfully obtain the transmitted wireless data, or at least the data unit comprising the most recent reply command, receiving device 302 can respond according to wireless protocols for acknowledgment of the stream of data stored in memory 308. Specifically, receiving device 302 can employ a data processor for executing modules configured to implement the wireless protocols. In at least one aspect, the modules can be included with an ACK/NACK apparatus 312. ACK/NACK apparatus 312 can comprise a parsing module 314 for analyzing the stream of data and identifying whether a subset of the stream of data is missing, wherein the stream of data comprises a data unit having a most recent reply command for the stream of data. Further, ACK/NACK apparatus 312 can comprise a response module 316 for sending a NACK if the subset of the stream of data is missing, or an ACK if the subset of the stream of data is not missing. If this ACK is successfully obtained by transmitting device 304, the stream of data can be continued. Otherwise, transmitting device can reply including the subset of the stream of data that is missing, as identified in the NACK. In the latter case, a receiver module 320 of ACK/NACK apparatus 312 obtains a re-transmission of the data unit having the most recent reply command with this reply.

In one aspect, this most recent reply command can be a single bit set to instruct receiving device 302 to respond to the re-transmission of the data unit. Further, in one example, parsing module 314 compares the re-transmission of the data unit to the subset of the stream of data, and further response module 316 sends the NACK if the re-transmission does not include the subset of the stream of data. Alternatively, response module 316 resends the ACK in response to the re-transmission of the data unit if the subset of the stream of data is not missing.

It should be appreciated that in at least one instance, the re-transmission of the data unit having the most recent reply command is in response to transmitting device 304 failing to receive the ACK or the NACK within a period established by the wireless protocols. To address this problem, response module 316 can be configured to send the ACK or NACK within this period established by the wireless protocols stored in memory 308. Accordingly, response module 316 sets a timer 318 to this time period upon the stream of data being received at wireless transceiver(s) 306. Utilizing timer 318, response module 316 can ensure response to the reply command within the time period established by the wireless protocols, so long as the data unit comprising the most recent reply command is received with the stream of data.

Figure 4:
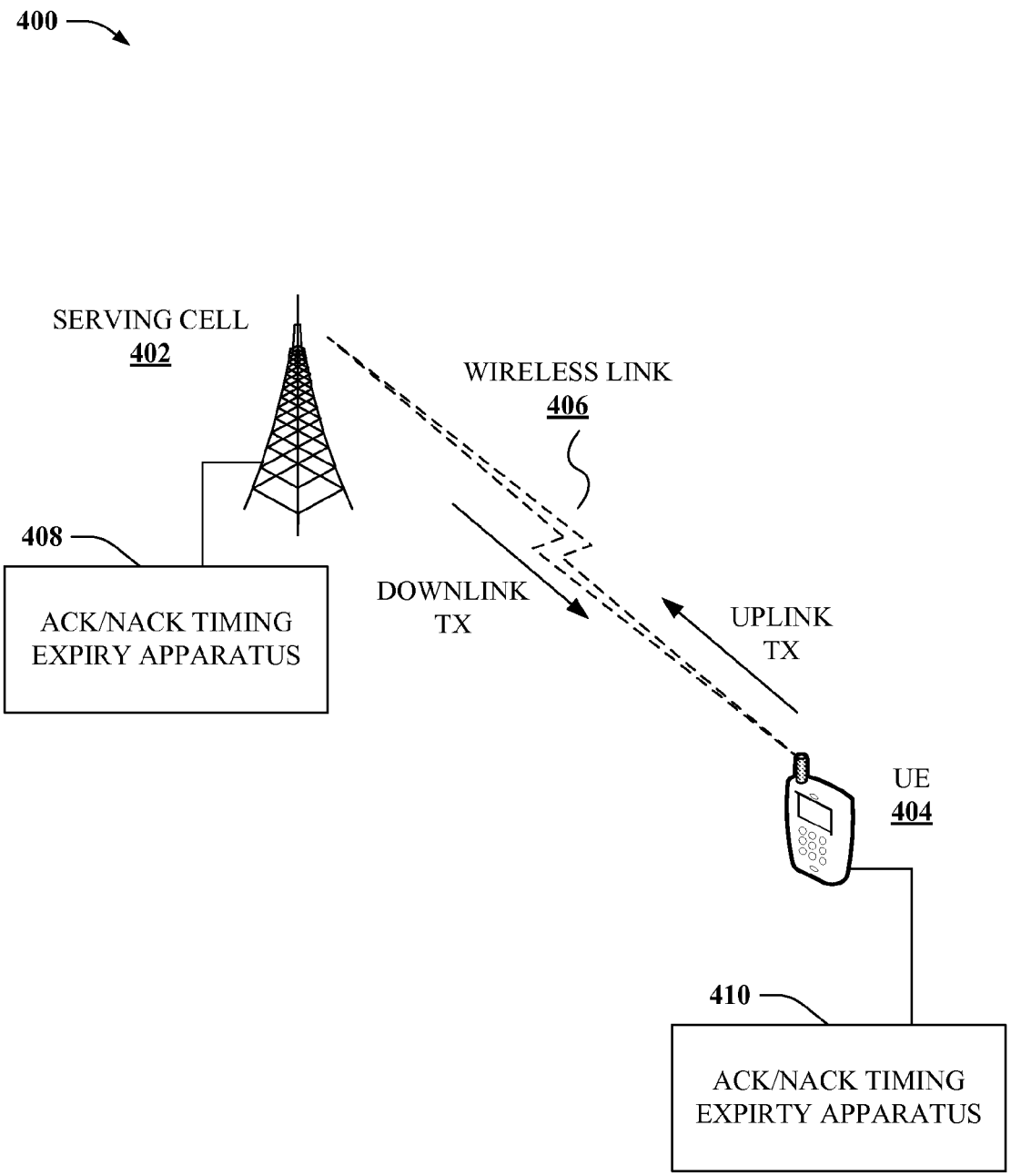
FIG. 4 illustrates a block diagram of an example wireless communication environment suitable for various disclosed aspects.

FIG. 4 depicts a block diagram of an example wireless communication arrangement 400 according to aspects of the subject disclosure. Wireless communication arrangement 400 comprises a serving cell 402 of a wireless network and a user equipment (UE) 404 sharing a wireless link 406 for exchanging data between serving cell 402 and UE 404. According to wireless protocols, serving cell 402 transmits data on a downlink transmission, whereas UE 404 transmits data on an uplink transmission. Further, responses (ACK or NACK) to downlink transmissions sent by serving cell 402 can be provided by UE 404 on the uplink transmission, and likewise responses to uplink transmissions sent by UE 404 can be provided by serving cell 402 on the downlink transmission. Accordingly, serving cell 402 transmits downlink sequences of data to UE 404 as well as responses to uplink sequences of data obtained from UE 404 with these downlink transmissions. Further, UE 404 transmits the uplink sequences of data as well as responses to the downlink sequences of data to serving cell 402 with these uplink transmissions.

Further to the above, serving cell 402 comprises an ACK/NACK timing expiry apparatus 408 for managing acknowledgments to downlink sequences of data expected from UE 404, as described herein. Similarly, UE 404 comprises an ACK/NACK timing expiry apparatus 410 for managing acknowledgments to uplink sequences of data expected from serving cell 402. It should be appreciated that ACK/NACK timing expiry apparatus 408 and ACK/NACK timing expiry apparatus 410 can be substantially similar to ACK/NACK timing expiry apparatus 102 of FIG. 1, supra, or substantially similar to ACK/NACK timing expiry apparatus 212, in various aspects of the subject disclosure. However, it is to be appreciated that the subject disclosure is not so limited. Furthermore, although not depicted, serving cell 402 or UE 404 can be coupled with or associated with an ACK/NACK apparatus (not depicted) for providing downlink and uplink acknowledgments, respectively, according to a set of control protocols governing wireless exchange of data over wireless link 406. In at least one aspect of the subject disclosure, one or more of these ACK/NACK apparatuses can be substantially similar to ACK/NACK apparatus 312, although the subject disclosure is not so limited.

Figure 5:
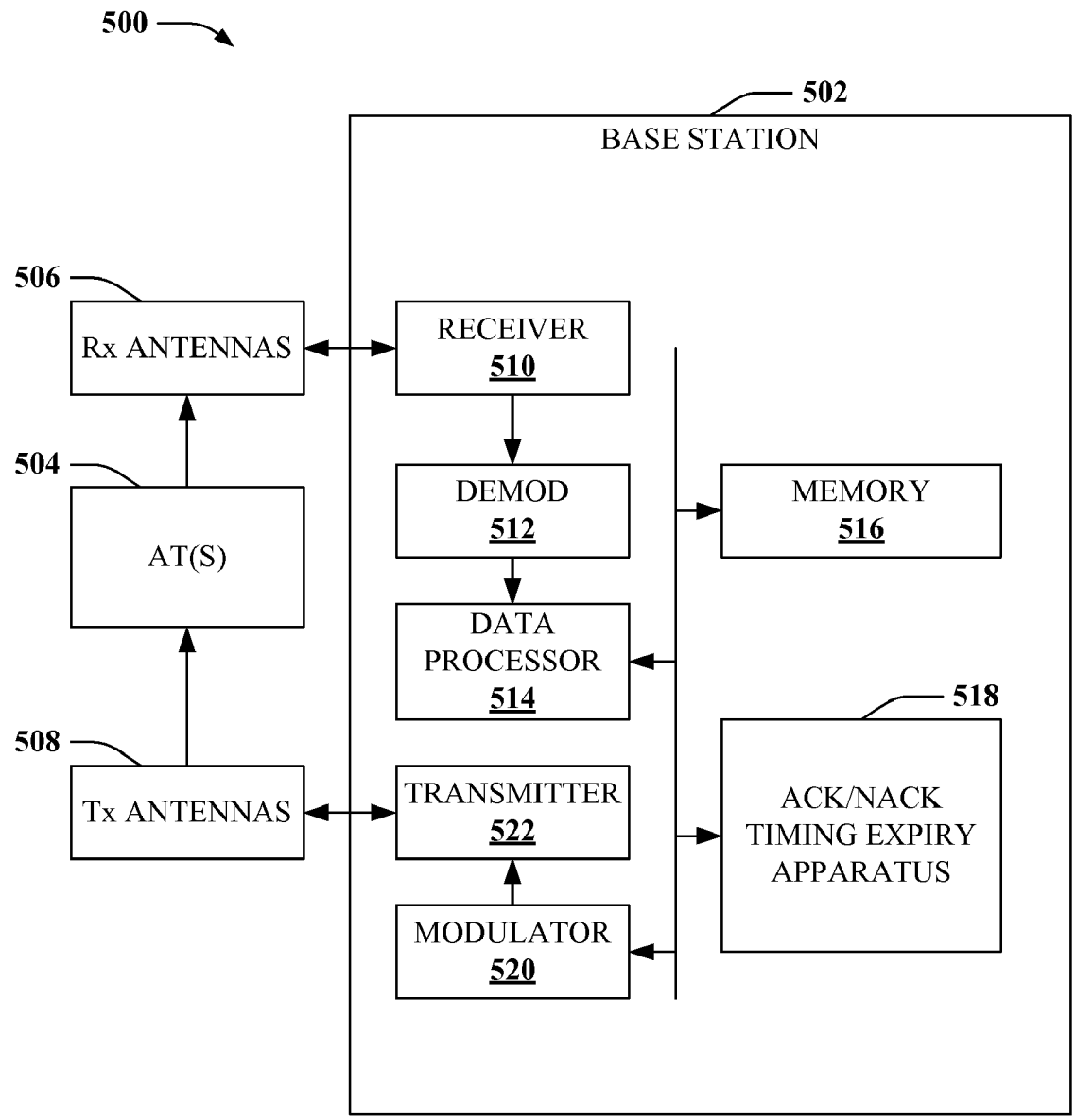
FIG. 5 depicts a block diagram of a sample ACK/NACK timing expiry apparatus in conjunction with a wireless network base station.

FIG. 5 illustrates a block diagram of an example system 500 comprising a base station 502 according to particular aspects of the subject disclosure. Base station 502 can be configured to provide improved timing provisioning for access terminals in a wireless network. Particularly, base station 502 can be configured to manage acknowledgment and re-transmission of wireless communication with remote devices. By providing such management, base station 502 can reduce redundancy in ARQ or HARQ or like transmissions, and improving bandwidth utilization for control signaling based on such transmissions.

Base station 502 (e.g., access point, . . . ) can comprise a receiver 510 that obtains wireless signals from AT(s) 504 through one or more receive antennas 506, and a transmitter 522 that sends coded/modulated wireless signals provided by modulator 520 to the AT(s) 504 through a transmit antenna(s) 508. Receive antenna(s) 506 and transmit antenna(s) 508, along with receiver 510 and transmitter 522, can comprise a set of wireless transceivers for implementing various aspects of the subject disclosure, as described herein.

Receiver 510 can obtain information from receive antennas 506 and can further comprise a signal recipient (not shown) that receives uplink data transmitted by AT(s) 504. Additionally, receiver 510 is operatively associated with a demodulator 512 that demodulates received information. Demodulated symbols are analyzed by a data processor 514. Data processor 514 is coupled to a memory 516 that stores information related to functions provided or implemented by base station 502.

Further to the above, base station 502 can comprise an ACK/NACK timing expiry apparatus 518 for providing the management of acknowledgment and re-transmission of wireless communication between base station 502 and AT(s) 504. Particularly, ACK/NACK timing expiry apparatus 518 can re-transmit data units (e.g., PDUs) lost by AT(s) 504 according to wireless protocols stored in memory 516. More particularly, when an expected response to a reply command is not received from AT(s) 504, ACK/NACK timing expiry apparatus 518 re-transmits a data unit comprising a most recent reply command for a radio bearer between base station 502 and AT(s) 504. Re-transmission of this data unit comprising the most recent reply command is configured to increase likelihood of re-transmitting a lost data unit, as well as minimize likelihood of re-transmitting a non-lost data unit, as described herein.

Figure 6:
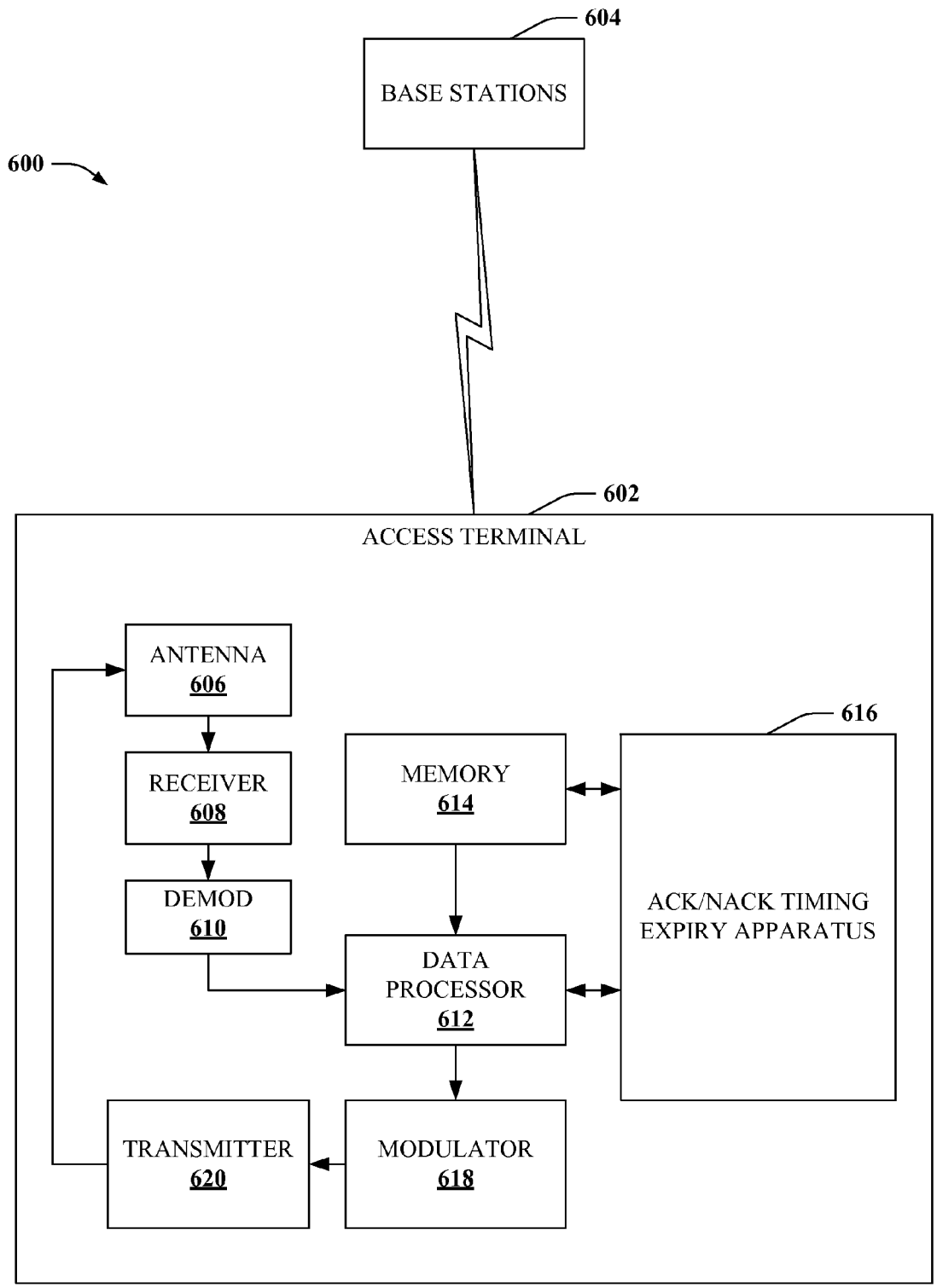
FIG. 6 illustrates a block diagram of a sample ACK/NACK timing expiry apparatus in conjunction with a wireless access terminal according to further aspects.

FIG. 6 depicts a block diagram of an example system comprising an AT 602 configured for wireless communication according to aspects of the subject disclosure. AT 602 can be configured to wirelessly couple with one or more base stations 604 (e.g., access point) of a wireless network. Based on such configuration, AT 602 can receive wireless signals from base station(s) 604 on a forward link channel and respond with wireless signals on a reverse link channel. In addition, AT 602 can comprise instructions stored in memory 614 for analyzing received wireless signals, extracting timing information pertinent to a non-serving cell that employs a different frequency than that of a serving cell, or the like, as described herein.

AT 602 includes at least one antenna 606 (e.g., a wireless transmission/reception interface or group of such interfaces comprising an input/output interface) that receives a signal and receiver(s) 608, which performs typical actions (e.g., filters, amplifies, down-converts, etc.) on the received signal. In general, antenna 606 and a transmitter 620 (collectively referred to as a transceiver) can be configured to facilitate wireless data exchange with base station(s) 604. Further, antenna 606, receiver 608, and transmitter 620, as well as demodulator 610 and modulator 618, can form a set of wireless transceivers for implementing the data exchange between base station(s) 604 and AT 602.

Antenna 606 and receiver(s) 608 can be coupled with demodulator 610 that can demodulate received symbols and provide such signals to a data processor(s) 612 for evaluation. It should be appreciated that data processor(s) 612 can control and/or reference one or more components (antenna 606, receiver 608, demodulator 610, memory 614, ACK/NACK timing expiry apparatus 616, modulator 628, transmitter 630) of AT 602. Further, data processor(s) 612 can execute one or more modules, applications, engines, or the like (ACK/NACK timing expiry apparatus 616) that comprise information or controls pertinent to executing functions of AT 602. For instance, such functions can include managing acknowledgment and re-transmission of wireless data with base station(s) 604, as described herein.

Additionally, memory 614 of AT 602 is operatively coupled to data processor(s) 612. Memory 614 can store data to be transmitted, received, and the like, and instructions suitable to conduct wireless communication with a remote device. Specifically, the instructions can be utilized to implement the various functions described above, or elsewhere herein. Further, in one alternative aspect, memory 614 can store ACK/NACK timing expiry apparatus 616 and modules contained therein (e.g., analysis module 214, ACK module 216, response module 218, timer 220, division module 222) executed by data processor(s) 612, above.

The aforementioned systems or apparatuses have been described with respect to interaction between several components, modules and/or communication interfaces. It should be appreciated that such systems and components/modules/interfaces can include those components/modules or sub-modules specified therein, some of the specified components/modules or sub-modules, and/or additional modules. For example, a system could include AT 602 comprising ACK/NACK apparatus 312 and ACK/NACK timing expiry apparatus 212, and base station 502, comprising ACK/NACK timing expiry apparatus 102 and ACK/NACK apparatus 312, or a different combination of these or other modules. Sub-modules could also be implemented as modules communicatively coupled to other modules rather than included within parent modules. Additionally, it should be noted that one or more modules could be combined into a single module providing aggregate functionality. For instance, ACK module 216 can include response module 218, or vice versa, to facilitate including a most recent poll element in a data unit re-transmission and re-transmission of the data unit and most recent poll element, by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 7-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

Figure 7:
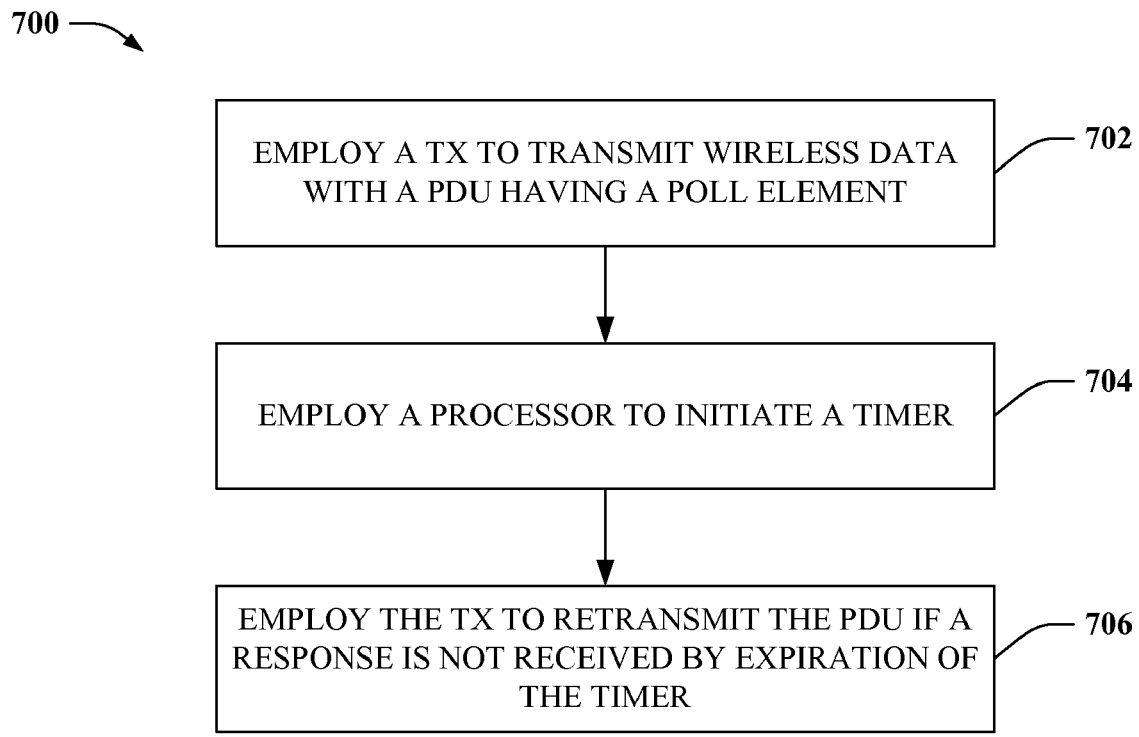
FIG. 7 illustrates a flowchart of an example methodology for providing acknowledgment and retransmission protocols for wireless communication.

FIG. 7 illustrates a flowchart of an example methodology 700 according to particular aspects of the subject disclosure. At 702, method 700 can comprise employing a wireless transmitter to transmit a set of wireless data, wherein a subset of the wireless data comprises a poll element (e.g., a reply command) that instructs a receiver to transmit a response to the set of wireless data. In some aspects of the subject disclosure, method 700 can comprise employing a single bit of the set of wireless data for the poll element. Alternatively, in other aspects, method 700 can comprise employing multiple bits of the set of wireless data for the poll element.

According to further aspects, transmitting the set of wireless data can further comprise selecting a PDU having a highest sequence number within the set of wireless data as the subset of the wireless data. Optionally, the set of wireless data comprises a subset of PDUs that were previously transmitted by the wireless receiver. For instance, in this latter optional aspect, method 700 can comprise receiving a NACK pertaining to the subset of PDUs, and further wherein employing the wireless transmitter to transmit the set of wireless data comprises re-transmitting the subset of PDUs in response to receiving the NACK.

In particular aspects, transmitting the set of wireless data can further comprise segmenting a PDU into multiple sub-PDU segments and employing the multiple sub-PDU segments for the set of wireless data. In these latter aspects, method 700 can further comprise selecting one of the multiple sub-PDU segments as the subset of the wireless data that comprises the poll bit. More particularly, method 700 can comprise employing a multiple sub-PDU segment having a highest sequence number among the sub-PDU segments as the one of the multiple sub-PDU segments.

At 704, method 700 can comprise employing a data processor to initiate a timer upon transmitting the set of wireless data. Further, at 706, method 700 can comprise employing the wireless transmitter to re-transmit the subset of the wireless data that comprises the poll element if the response is not received by expiration of the timer. Further to the above, in specific aspects, method 700 can comprise receiving the response to the set of wireless data, and analyzing the response to identify a missing PDU of the set of wireless data that the receiver failed to obtain. In these specific aspects, method 700 can also comprise retransmitting the PDU along with a second poll element that instructs the receiver to send an ACK for the missing PDU, initiating a second timer upon retransmitting the missing PDU, and re-transmitting the missing PDU and the second poll element of the ACK is not received upon expiration of the second timer.

Figure 8:
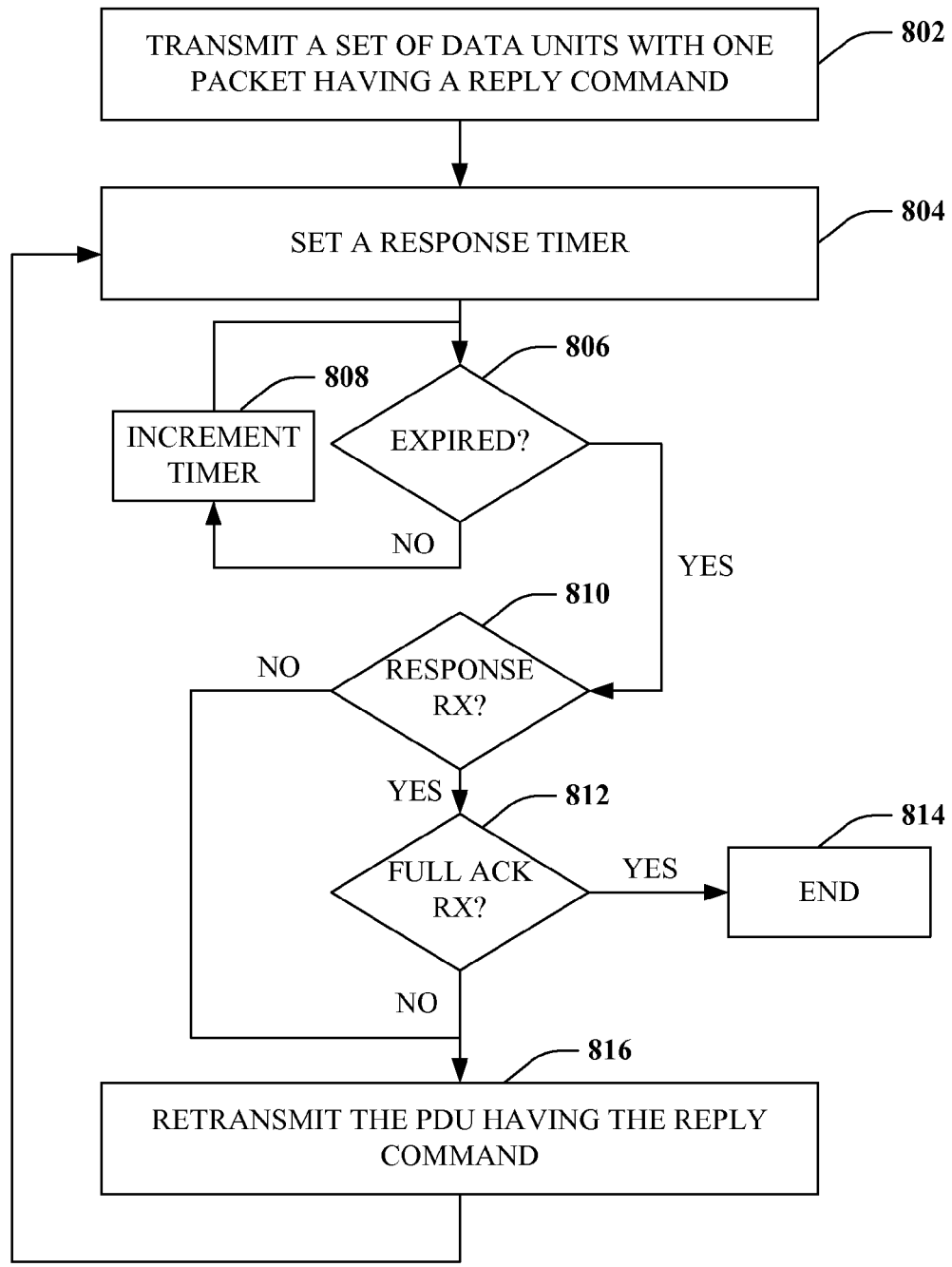
FIG. 8 depicts a flowchart of a sample methodology for providing poll timer expiry according to particular aspects disclosed herein.

FIG. 8 depicts a flowchart of an example methodology 800 according to still other aspects of the subject disclosure. At 802, method 800 can comprise transmitting a set of data units with one data unit, or sub-data unit, having a reply command. At 804, method 800 can comprise setting a response timer upon transmitting the set of data units. At 806, method 800 can determine whether the response timer is expired. If not, method 800 proceeds to 808 where the response timer is increment, and method 800 returns to reference number 806. On the other hand, if the response timer is determined to be expired at reference number 806, method 800 can proceed to 810.

At 810, method 800 can comprise determining whether a response to transmitting the set of data units has been received. If so, method 800 can proceed to 812; otherwise method 800 proceeds to 816. At 812, method 800 can determine whether a full ACK for the set of data units is received. If so, method 800 proceeds to 814 and ends. Otherwise, method 800 proceeds to 816. At 816, method 800 can retransmit the data unit having the reply command. Additionally, method 804 can then return to reference number 804.

Figure 9:
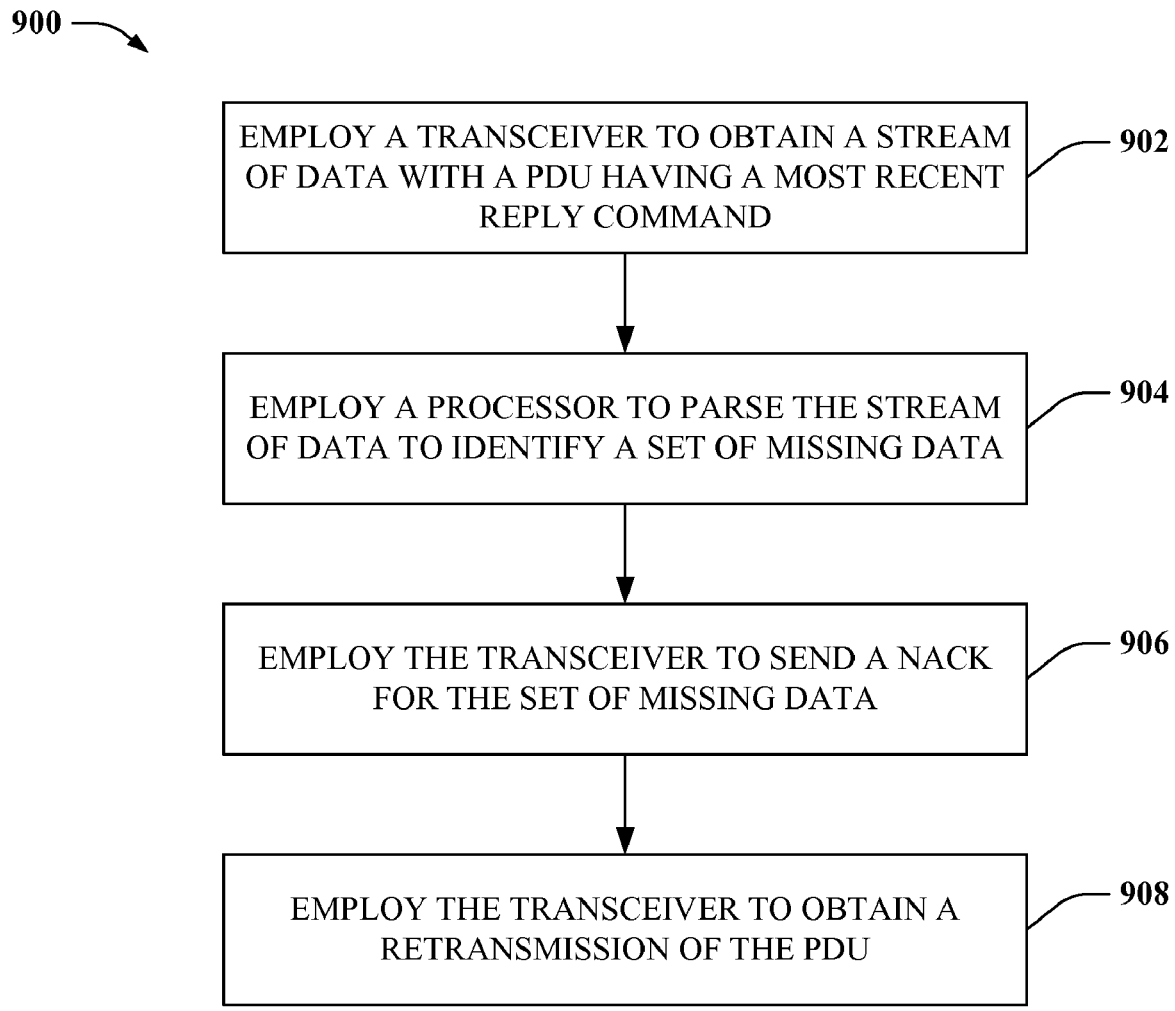
FIG. 9 illustrates a flowchart of a sample methodology for receiving wireless transmission according to other aspects of the subject disclosure.

FIG. 9 illustrates a flowchart of an example methodology 900 according to still other aspects of the subject disclosure. At 902, method 900 can comprise employing a wireless transceiver to obtain a stream of data comprising a data unit having a most recent reply command for the stream of data. In one aspect, the stream of data comprises a set of sub-PDU segments, and the data unit having the most recent reply command is a sub-PDU segment having a highest sequence number of the set of sub-PDU segments.

At 904, method 900 can comprise employing a data processor to parse the stream of data and to identify a set of missing data. In some aspects, parsing the stream of data can further comprise identifying a set of transmitted data units (e.g., PDUs) and a set of received data units, and comparing the set of received data units to the set of transmitted data units to identify the set of missing data. Additionally, at 906, method 900 can comprise employing the wireless transceiver to send a NACK for the set of missing data. Further to the above, method 900, at 908, can comprise employing the wireless transceiver to obtain a re-transmission of the data unit having the most recent reply command.

According to alternative aspects of the subject disclosure, method 900 can comprise sending the NACK for the set of missing data within a time period specified by or inferred from the most recent reply command. According to other alternative aspects, method 900 can comprise receiving a set of re-transmitted data with the re-transmission of the data unit, where the re-transmission of the data unit comprises a subsequent reply command, and identifying whether the set of re-transmitted data includes all data of the set of missing data. In this latter aspect, method 900 can also comprise sending a second NACK in response to the subsequent reply command if the re-transmitted data does not include all data of the set of missing data. Additionally, this latter aspect can also comprise receiving a second set of re-transmitted data and a second re-transmission of the data unit in response to sending the second NACK, wherein the second re-transmission of the data unit comprises an additional reply command.

In still other alternative aspects, the stream of data comprises a set of sub-PDU segments. In such aspects, the data unit having the most recent reply command is a sub-PDU segment having a highest sequence number of the set of sub-PDU segments. Further according to these latter aspects, method 900 can comprise receiving a re-transmission of the sub-PDU segment having the highest sequence number in response to the NACK for the set of missing data.

Figure 10:
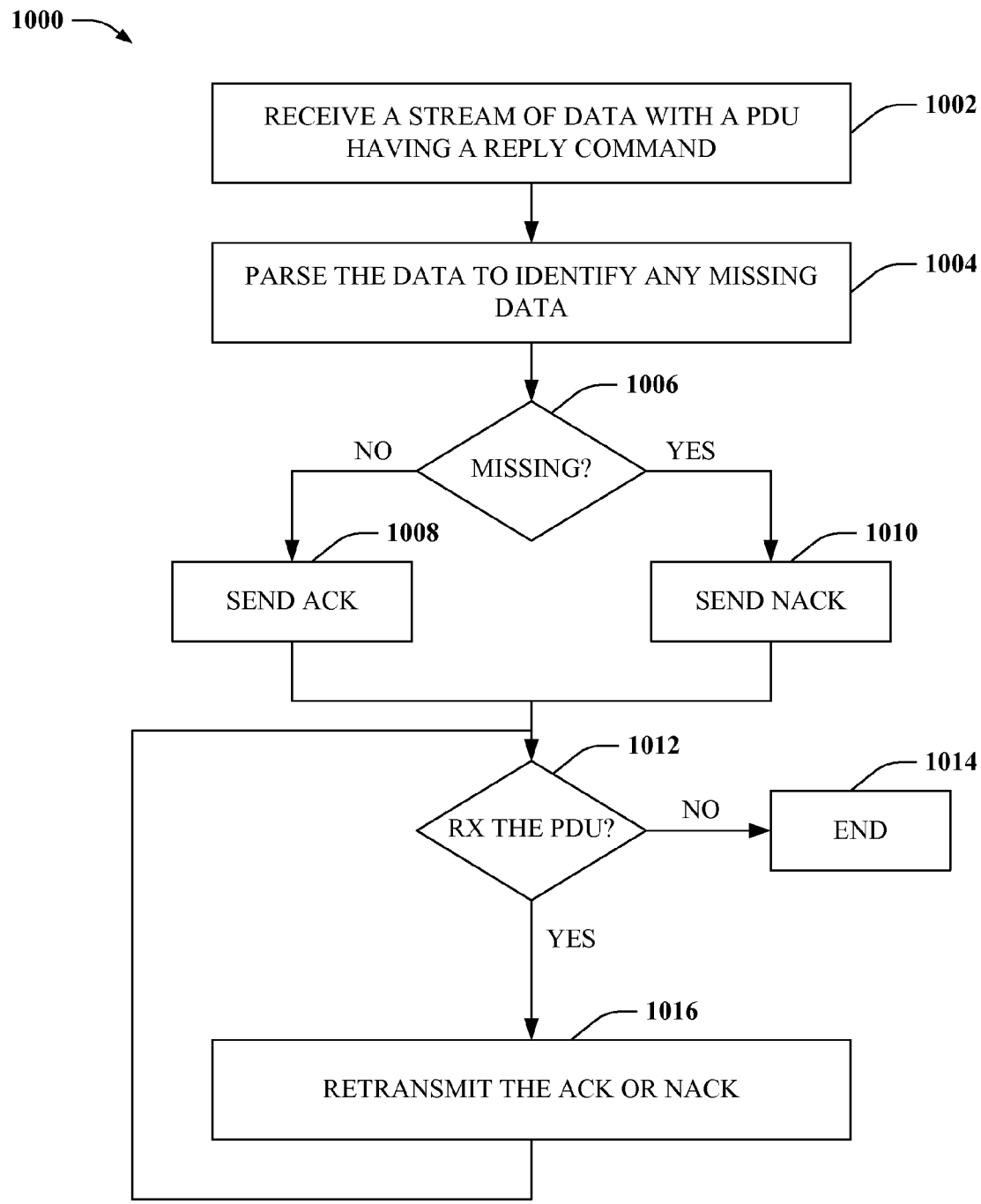
FIG. 10 depicts a flowchart of an example methodology for incorporating poll timer expiry in wireless communication according to still other aspects.

FIG. 10 depicts a flowchart of an additional methodology according to one or more further aspects of the subject disclosure. At 1002, method 1000 can comprise receiving a stream of data with a PDU having a reply command within the stream of data. At 1004, method 1000 can comprise parsing the data to identify any missing data of the stream of data. At 1006, method 1000 can comprise determining whether any missing data is identified from the parsing. If missing data is identified, method 1000 can proceed to 1010. Otherwise, method 1000 proceeds to 1008.

At 1008, method 1000 comprises sending an ACK in response to receiving the stream of data. Method 1000 can then proceed to 1012. At 1010, method 1000 instead comprises sending a NACK in response to receiving the stream of data and identifying the missing data. In some aspects, the NACK can comprise identifying the missing data (e.g., by PDU sequence number(s)). At 1012, method 1000 determines whether the PDU having the reply command is subsequently received. If not, method 1000 proceeds to 1014 and ends. If the PDU having the reply command is subsequently received, method 1000 can proceed to 1016 and retransmit the ACK or the NACK, depending on whether the parsing at reference number 1004 identified any missing data from the stream of data.

Figure 11:
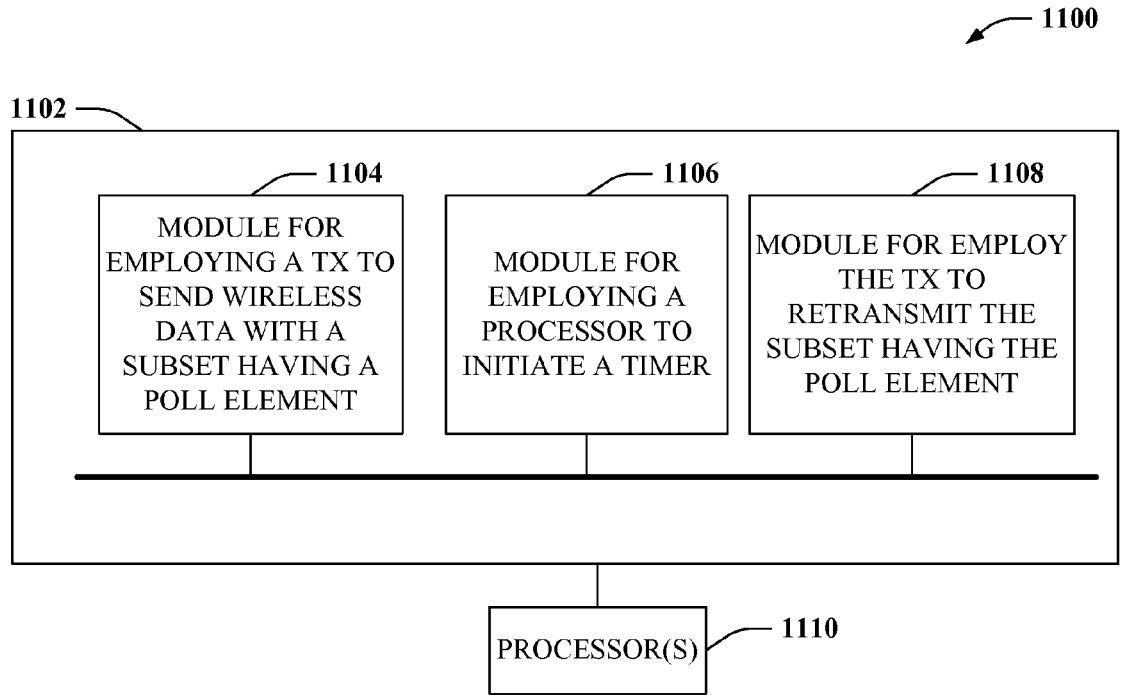
FIG. 11 illustrates a block diagram of an example system or device for providing acknowledgment and retransmission in wireless communication.
Figure 12:
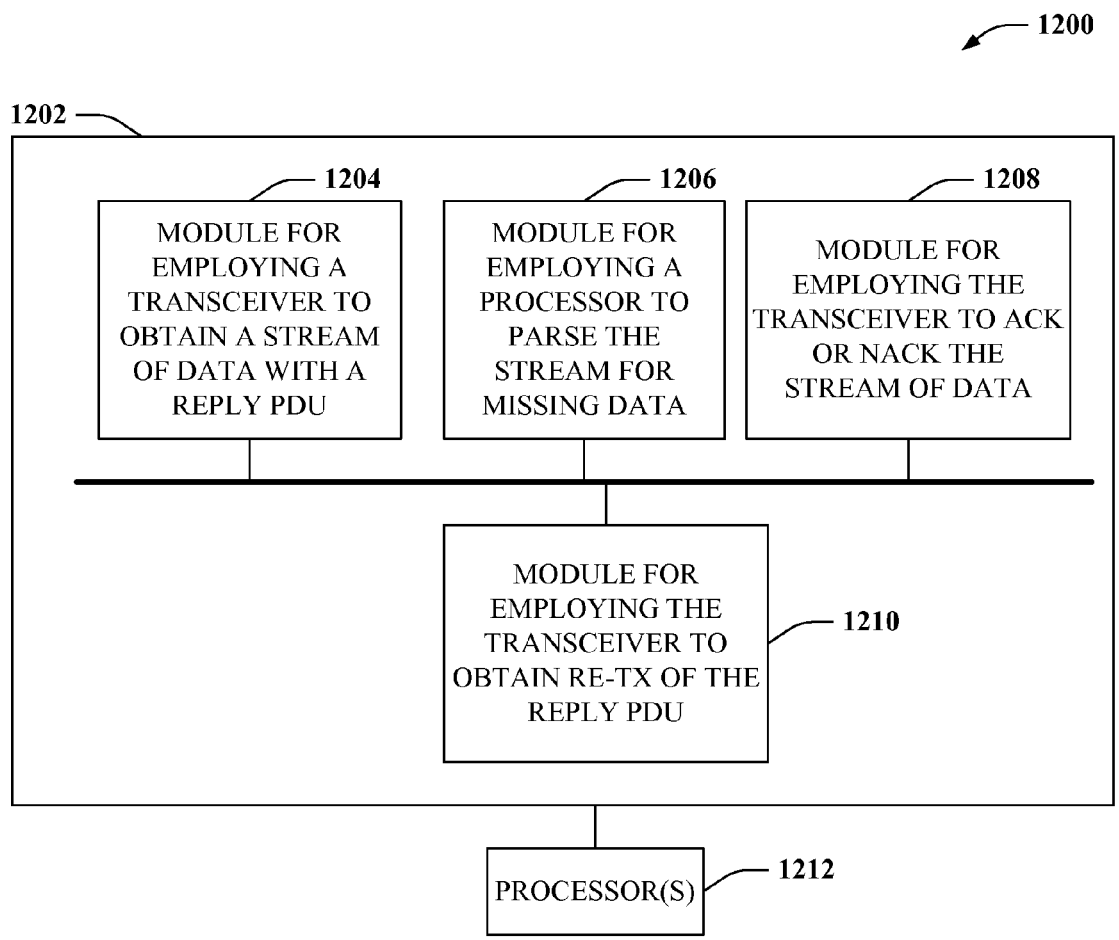
FIG. 12 depicts a block diagram of a sample system or device for incorporating acknowledgment and retransmission for wireless communication.

FIGS. 11 and 12 illustrate respective example systems 1100, 1200 for implementing improved acknowledgment and re-transmission protocols for wireless communication according to aspects of the subject disclosure. For instance, systems 1100, 1200 can reside at least partially within a wireless communication network and/or within a wireless receiver such as a node, base station, access point, user terminal, personal computer coupled with a mobile interface card, or the like. It is to be appreciated that systems 1100, 1200 are represented as including functional blocks, which can be functional blocks that represent functions implemented by a processor, software, or combination thereof (e.g., firmware).

System 1100 can comprise memory 1102 for storing modules configured to execute functions of system 1100. Particularly, system 1100 comprises a module 1104 for employing a wireless transmitter to transmit a set of wireless data, wherein a subset of the wireless data comprises a poll element that instructs a receiver to transmit a response to the set of wireless data. Further, system 1100 comprises a module 1106 for employing a data processor 1110 to initiate a timer upon transmitting the set of wireless data. Further still, system 1100 comprises a module 1108 for employing the wireless transmitter to re-transmit the subset of the wireless data that comprises the poll element if the response is not received by expiration of the timer.

System 1200 can comprise memory 1202 for storing modules configured to execute functions of system 1200. Specifically, system 1200 comprises a module 1204 for employing a wireless transceiver to obtain a stream of data comprising a data unit having a most recent reply command for the stream of data. Additionally, system 1200 comprises a module 1206 for employing a data processor 1212 to parse the stream of data and to identify whether a subset of the set of data is missing. Moreover, system 1200 can comprise a module 1208 for employing the wireless transceiver to send a NACK or an ACK if the subset of the set of data is missing or not missing, respectively. Further to the above, system 1200 comprises a module 1210 for employing the wireless transceiver to obtain a re-transmission of the data unit having the most recent reply command.

Figure 13:
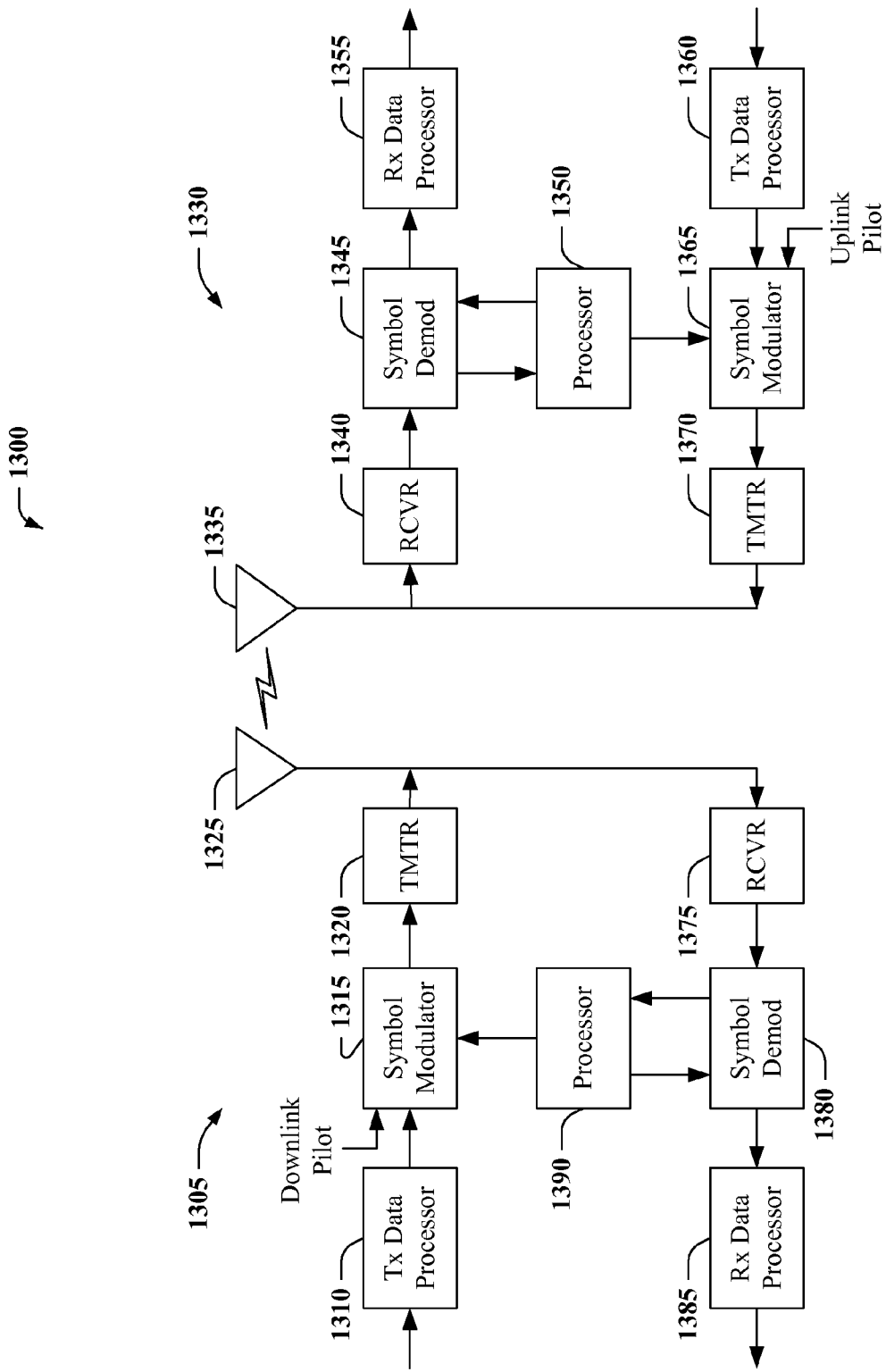
FIG. 13 depicts a block diagram of a sample wireless communications apparatus employed in implementing various aspects of the subject disclosure.

FIG. 13 depicts a block diagram of an example system 1300 that can facilitate wireless communication according to some aspects disclosed herein. On a downlink, at access point 1305, a transmit (TX) data processor 1310 receives, formats, codes, interleaves, and modulates (or symbol maps) traffic data and provides modulation symbols ("data symbols"). A symbol modulator 1315 receives and processes the data symbols and pilot symbols and provides a stream of symbols. A symbol modulator 1315 multiplexes data and pilot symbols and provides them to a transmitter unit (TMTR) 1320. Each transmit symbol can be a data symbol, a pilot symbol, or a signal value of zero. The pilot symbols can be sent continuously in each symbol period. The pilot symbols can be frequency division multiplexed (FDM), orthogonal frequency division multiplexed (OFDM), time division multiplexed (TDM), code division multiplexed (CDM), or a suitable combination thereof or of like modulation and/or transmission techniques.

TMTR 1320 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1325 to the terminals. At terminal 1330, an antenna 1335 receives the downlink signal and provides a received signal to a receiver unit (RCVR) 1340. Receiver unit 1340 conditions (e.g., filters, amplifies, and frequency downconverts) the received signal and digitizes the conditioned signal to obtain samples. A symbol demodulator 1345 demodulates and provides received pilot symbols to a processor 1350 for channel estimation. Symbol demodulator 1345 further receives a frequency response estimate for the downlink from processor 1350, performs data demodulation on the received data symbols to obtain data symbol estimates (which are estimates of the transmitted data symbols), and provides the data symbol estimates to an RX data processor 1355, which demodulates (i.e., symbol demaps), deinterleaves, and decodes the data symbol estimates to recover the transmitted traffic data. The processing by symbol demodulator 1345 and RX data processor 1355 is complementary to the processing by symbol modulator 1315 and TX data processor 1310, respectively, at access point 1305.

On the uplink, a TX data processor 1360 processes traffic data and provides data symbols. A symbol modulator 1365 receives and multiplexes the data symbols with pilot symbols, performs modulation, and provides a stream of symbols. A transmitter unit 1370 then receives and processes the stream of symbols to generate an uplink signal, which is transmitted by the antenna 1335 to the access point 1305. Specifically, the uplink signal can be in accordance with SC-FDMA requirements and can include frequency hopping mechanisms as described herein.

At access point 1305, the uplink signal from terminal 1330 is received by the antenna 1325 and processed by a receiver unit 1375 to obtain samples. A symbol demodulator 1380 then processes the samples and provides received pilot symbols and data symbol estimates for the uplink. An RX data processor 1385 processes the data symbol estimates to recover the traffic data transmitted by terminal 1330. A processor 1390 performs channel estimation for each active terminal transmitting on the uplink. Multiple terminals can transmit pilot concurrently on the uplink on their respective assigned sets of pilot sub-bands, where the pilot sub-band sets can be interlaced.

Processors 1390 and 1350 direct (e.g., control, coordinate, manage, etc.) operation at access point 1305 and terminal 1330, respectively. Respective processors 1390 and 1350 can be associated with memory units (not shown) that store program codes and data. Processors 1390 and 1350 can also perform computations to derive frequency and time-based impulse response estimates for the uplink and downlink, respectively.

For a multiple-access system (e.g., SC-FDMA, FDMA, OFDMA, CDMA, TDMA, etc.), multiple terminals can transmit concurrently on the uplink. For such a system, the pilot sub-bands can be shared among different terminals. The channel estimation techniques can be used in cases where the pilot sub-bands for each terminal span the entire operating band (possibly except for the band edges). Such a pilot sub-band structure would be desirable to obtain frequency diversity for each terminal. The techniques described herein can be implemented by various means. For example, these techniques can be implemented in hardware, software, or a combination thereof. For a hardware implementation, which can be digital, analog, or both digital and analog, the processing units used for channel estimation can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes can be stored in memory unit and executed by the processors 1390 and 1350.

Figure 14:
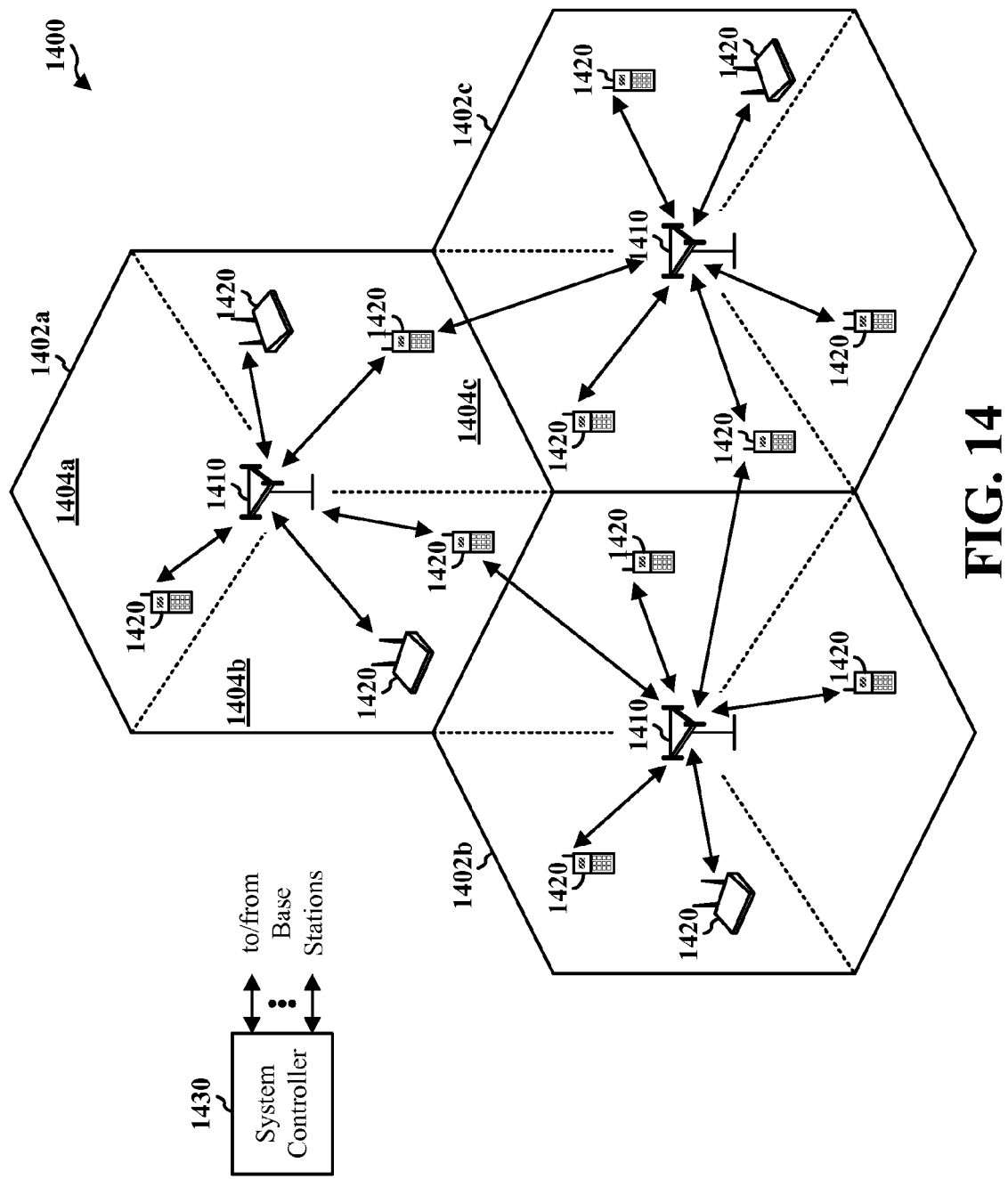
FIG. 14 illustrates a block diagram of an example cellular environment for wireless communications according to further aspects.

FIG. 14 illustrates a wireless communication system 1400 with multiple base stations (BSs) 1410 (e.g., wireless access points, wireless communication apparatus) and multiple terminals 1420 (e.g., ATs), such as can be utilized in conjunction with one or more aspects. A BS 1410 is generally a fixed station that communicates with the terminals and can also be called an access point, a Node B, or some other terminology. Each BS 1410 provides communication coverage for a particular geographic area or coverage area, illustrated as three geographic areas in FIG. 14, labeled 1402a, 1402b, and 1402c. The term "cell" can refer to a BS or its coverage area depending on the context in which the term is used. To improve system capacity, a BS geographic area/coverage area can be partitioned into multiple smaller areas (e.g., three smaller areas, according to cell 1402a in FIG. 14), 1404a, 1404b, and 1404c. Each smaller area (1504a, 1404b, 1404c) can be served by a respective base transceiver subsystem (BTS). The term "sector" can refer to a BTS or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the subject description, unless specified otherwise, the term "base station" is used generically for a fixed station that serves a sector as well as a fixed station that serves a cell.

Terminals 1420 are typically dispersed throughout the system, and each terminal 1420 can be fixed or mobile. Terminals 1420 can also be called a mobile station, user equipment, a user device, wireless communication apparatus, an access terminal, a user terminal or some other terminology. A terminal 1420 can be a wireless device, a cellular phone, a personal digital assistant (PDA), a wireless modem card, and so on. Each terminal 1420 can communicate with zero, one, or multiple BSs 1410 on the downlink (e.g., FL) and uplink (e.g., RL) at any given moment. The downlink refers to the communication link from the base stations to the terminals, and the uplink refers to the communication link from the terminals to the base stations.

For a centralized architecture, a system controller 1430 couples to base stations 1410 and provides coordination and control for BSs 1410. For a distributed architecture, BSs 1410 can communicate with one another as needed (e.g., by way of a wired or wireless backhaul network communicatively coupling the BSs 1410). Data transmission on the forward link often occurs from one access point to one access terminal at or near the maximum data rate that can be supported by the forward link or the communication system. Additional channels of the forward link (e.g., control channel) can be transmitted from multiple access points to one access terminal. Reverse link data communication can occur from one access terminal to one or more access points.

Figure 15:
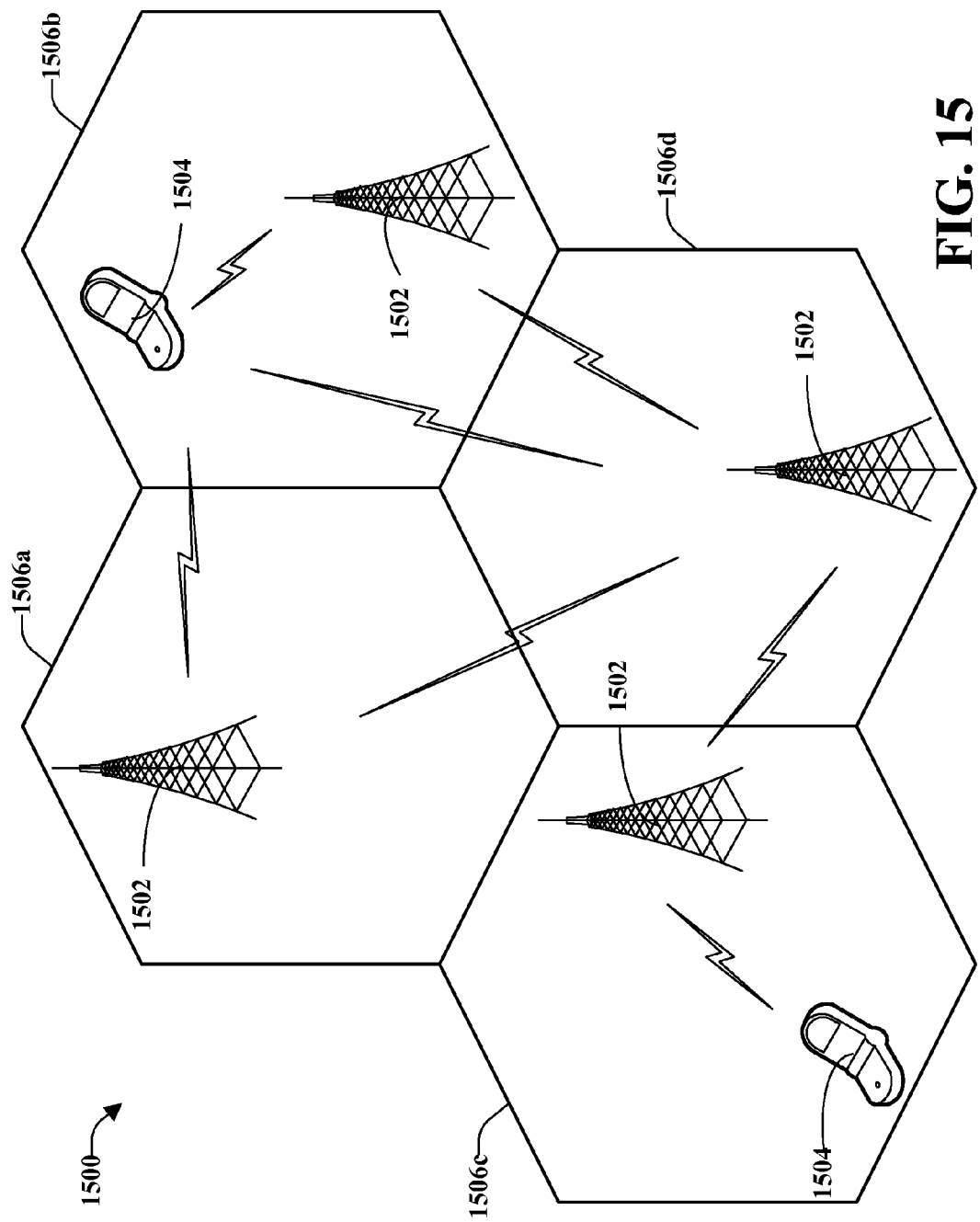
FIG. 15 depicts a block diagram of an example wireless signaling environment for wireless communications.

FIG. 15 is an illustration of a planned or semi-planned wireless communication environment 1500, in accordance with various aspects. Wireless communication environment 1500 can comprise one or more BSs 1502 in one or more cells and/or sectors that receive, transmit, repeat, etc., wireless communication signals to each other and/or to one or more mobile devices 1504. As illustrated, each BS 1502 can provide communication coverage for a particular geographic area, illustrated as four geographic areas, labeled 1506a, 1506b, 1506c and 1506d. Each BS 1502 can comprise a transmitter chain and a receiver chain, each of which can in turn comprise a plurality of components associated with signal transmission and reception (e.g., processors, modulators, multiplexers, demodulators, demultiplexers, antennas, and so forth, see FIG. 13, supra), as will be appreciated by one skilled in the art. Mobile devices 1504 can be, for example, cellular phones, smart phones, laptops, handheld communication devices, handheld computing devices, satellite radios, global positioning systems, PDAs, or any other suitable device for communicating over wireless communication environment 1500. Wireless communication environment 1500 can be employed in conjunction with various aspects described herein in order to facilitate improved acknowledgment and re-transmission protocols in wireless communications, as set forth herein.

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process, or thread of execution; and a module can be localized on one electronic device, or distributed between two or more electronic devices. Further, these modules can execute from various computer-readable media having various data structures stored thereon. The modules can communicate by way of local or remote processes such as in accordance with a signal having one or more data units (e.g., data from one component interacting with another component in a local system, distributed system, or across a network such as the Internet with other systems by way of the signal). Additionally, components or modules of systems described herein can be rearranged, or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a user equipment (UE). A UE can also be called a system, a subscriber unit, a subscriber station, mobile station, mobile, mobile communication device, mobile device, remote station, remote terminal, access terminal (AT), user agent (UA), a user device, or user terminal (UE). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more ASICs, DSPs, DSPDs, PLDs, FPGAs, discrete gate or transistor logic, discrete hardware components, general purpose processors, controllers, micro-controllers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps or actions of a method or algorithm can reside as at least one or any combination or set of codes or instructions on a machine-readable medium, or computer-readable medium, which can be incorporated into a computer program product. The term "article of manufacture" as used herein is intended to encompass a computer program accessible from any suitable computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, as used herein, the terms to "infer" or "inference" refer generally to the process of reasoning about or inferring states of the system, environment, or user from a set of observations as captured via events, or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events, or data. Such inference results in the construction of new events or actions from a set of observed events and/or stored event data, whether or not the events are correlated in close temporal proximity, and whether the events and data come from one or several event and data sources.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method of wireless communication, comprising:
   employing a wireless transmitter to transmit a set of wireless data, wherein a subset of the set of wireless data comprises a poll element that instructs a receiver to transmit a response to the set of wireless data;
   employing a data processor to initiate a timer upon transmitting the set of wireless data; and
   employing the wireless transmitter to retransmit the subset of the set of wireless data that comprises the poll element if the response is not received by expiration of the timer.

2. The method of claim 1, further comprising selecting a protocol data unit (a PDU) having a highest sequence number within a most recent data transmission as the subset of the set of wireless data, wherein the poll element is a most recent poll element for the set of wireless data.

3. The method of claim 1, further comprising segmenting a PDU into multiple sub-PDU segments and employing the multiple sub-PDU segments for the set of wireless data.

4. The method of claim 3, further comprising selecting one of the multiple sub-PDU segments as the subset of the set of wireless data that comprises the poll element.

5. The method of claim 4, further comprising employing a multiple sub-PDU segment having a highest sequence number among the multiple sub-PDU segments as the one of the multiple sub-PDU segments, wherein the poll element is a most recent poll element sent by the wireless transmitter on a radio bearer supporting the set of wireless data.

6. The method of claim 1, further comprising employing a single bit of the set of wireless data for the poll element.

7. The method of claim 1, further comprising employing multiple bits of the set of wireless data for the poll element.

8. The method of claim 1, wherein the set of wireless data comprises a subset of PDUs that were previously transmitted by the wireless transmitter.

9. The method of claim 8, further comprising receiving a negative acknowledgment (a NACK) pertaining to the subset of PDUs, and further wherein employing the wireless transmitter to transmit the set of wireless data comprises retransmitting the subset of PDUs in response to receiving the NACK.

10. The method of claim 1, further comprising receiving the response to the set of wireless data, and analyzing the response to identify a missing PDU of the set of wireless data that the receiver failed to obtain.

11. The method of claim 10, further comprising:
    retransmitting the missing PDU along with a second poll element that instructs the receiver to send an ACK for the missing PDU;
    initiating a second timer upon retransmitting the missing PDU; and
    retransmitting the missing PDU and the second poll element if the ACK is not received upon expiration of the second timer.

12. An apparatus for wireless communication, comprising:
    a wireless transceiver for sending and receiving wireless data;
    memory for storing control protocols for acknowledgment (ACK) and retransmission of wireless data; and
    a data processor for executing modules that implement the control protocols, the modules comprising:
       an analysis module that identifies a set of transmitted data associated with a negative acknowledgment (a set of NACKed data);
       an acknowledgment module (an ACK module) that includes a reply command with a subset of the set of NACKed data and that employs the wireless transceiver to re-transmit the set of NACKed data; and
       a response module that retransmits the subset of the set of NACKed data if a default time expires before receiving a response to retransmission of the set of NACKed data.

13. The apparatus of claim 12, wherein the reply command is a single bit command.

14. The apparatus of claim 12, wherein the reply command is a multi-bit command.

15. The apparatus of claim 12, wherein the reply command is configured to instruct a receiving device to ACK or NACK retransmission of the set of NACKed data.

16. The apparatus of claim 12, wherein the set of NACKed data comprises a set of protocol data units (a set of PDUs) that were not obtained by a receiving device.

17. The apparatus of claim 16, wherein the ACK module includes the reply command with one of the set of PDUs having a highest sequence number of the set of PDUs.

18. The apparatus of claim 12, further comprising a division module that segments the set of NACKed data into a plurality of sub-PDU segments.

19. The apparatus of claim 18, wherein the ACK module includes the reply command into one of the plurality of sub-PDU segments.

20. The apparatus of claim 19, wherein the response module retransmits the one of the plurality of sub-PDU segments if the default time expires before receiving the response.

21. The apparatus of claim 12 implemented in conjunction with a wireless network base station or implemented in conjunction with a mobile communication device.

22. The apparatus of claim 12, wherein the control protocols are configured for a third generation partnership project (3GPP) long term evolution (LTE) system, a 3GPP LTE advanced system, a universal mobile telecommunication system, or a high speed packet access system.

23. An apparatus for wireless communication, comprising:
    means for employing a wireless transmitter to transmit a set of wireless data, wherein a subset of the set of wireless data comprises a poll element that instructs a receiver to transmit a response to the set of wireless data;
    means for employing a data processor to initiate a timer upon transmitting the set of wireless data; and
    means for employing the wireless transmitter to retransmit the subset of the set of wireless data that comprises the poll element if the response is not received by expiration of the timer.

24. At least one processor configured for wireless communication, comprising:
    a module that transmits a set of wireless data, wherein a subset of the set of wireless data comprises a poll element that instructs a receiver to transmit a response to the set of wireless data;
    a module that initiates a timer upon transmitting the set of wireless data; and
    a module that retransmits the subset of the set of wireless data that comprises the poll element if the response is not received by expiration of the timer.

25. A computer program product, comprising:
    a non-transitory computer-readable medium, comprising:
    code for causing a computer to transmit a set of wireless data, wherein a subset of the set of wireless data comprises a poll element that instructs a receiver to transmit a response to the set of wireless data;
    code for causing the computer to initiate a timer upon transmitting the set of wireless data; and code for causing the computer to retransmit the subset of the set of wireless data that comprises the poll element if the response is not received by expiration of the timer.

26. A method of receiving wireless communication, comprising:
  employing a wireless transceiver to obtain a stream of data comprising a data unit having a most recent reply command for the stream of data;
  employing a data processor to parse the stream of data and to identify a set of missing data;
  employing the wireless transceiver to send a negative acknowledgment (a NACK) for the set of missing data; and
  employing the wireless transceiver to obtain a retransmission of the data unit having the most recent reply command.

27. The method of claim 26, further comprising sending the NACK for the set of missing data within a time period specified by or inferred from the most recent reply command.

28. The method of claim 26, wherein parsing the stream of data further comprises identifying a set of transmitted protocol data units (PDUs) and a set of received PDUs, and comparing the set of received PDUs to the set of transmitted PDUs to identify the set of missing data.

29. The method of claim 26, further comprising:
  receiving a set of retransmitted data with the retransmission of the data unit, where the retransmission of the data unit comprises a subsequent reply command; and
  identifying whether the set of retransmitted data includes all data of the set of missing data.

30. The method of claim 29, further comprising sending a second NACK in response to the subsequent reply command if the set of retransmitted data does not include all data of the set of missing data.

31. The method of claim 30, further comprising receiving a second set of retransmitted data and a second retransmission of the data unit in response to sending the second NACK, wherein the second retransmission of the data unit comprises an additional reply command.

32. The method of claim 26, wherein the stream of data comprises a set of sub-protocol data unit segments (a set of sub-PDU segments), and the data unit having the most recent reply command is a sub-PDU segment having a highest sequence number of the set of sub-PDU segments.

33. The method of claim 32, further comprising receiving a retransmission of the sub-PDU segment having the highest sequence number in response to the NACK for the set of missing data.

34. An apparatus for receiving wireless communication, comprising:
  a wireless transceiver for sending and receiving a stream of data;
  memory for storing wireless protocols for acknowledgment of the stream of data;
  a data processor for executing modules configured to implement the wireless protocols, the modules comprising:
    a parsing module for analyzing the stream of data and identifying whether a subset of the stream of data is missing, wherein the stream of data comprises a data unit having a most recent reply command for the stream of data;
    a response module for sending a negative acknowledgment (a NACK) if the subset of the stream of data is missing, or an acknowledgment (an ACK) if the subset of the stream of data is not missing; and
    a receiver module that obtains a retransmission of the data unit having the most recent reply command.

35. The apparatus of claim 34, wherein the most recent reply command comprises a single bit set to instruct the apparatus to respond to the retransmission of the data unit.

36. The apparatus of claim 34, wherein the parsing module compares the retransmission of the data unit to the subset of the stream of data, and further wherein the response module re-sends the NACK if the retransmission does not include the subset of the stream of data.

37. The apparatus of claim 34, wherein the response module resends the ACK in response to the retransmission of the data unit if the subset of the stream of data is not missing.

38. The apparatus of claim 34, wherein the stream of data comprises a set of protocol data units (a set of PDUs).

39. The apparatus of claim 38, wherein the data unit comprises one of the set of PDUs having a highest sequence number of the set of PDUs.

40. The apparatus of claim 34, wherein the stream of data at least in part comprises a set of sub-PDU segments.

41. The apparatus of claim 40, wherein the data unit comprises one of the set of sub-PDU segments having a highest sequence number.

42. The apparatus of claim 34, wherein the retransmission of the data unit having the most recent reply command is in response to a transmitting device failing to receive the ACK or the NACK within a period established by the wireless protocols.

43. An apparatus for receiving wireless communication, comprising:
  means for employing a wireless transceiver to obtain a stream of data comprising a data unit having a most recent reply command for the stream of data;
  means for employing a data processor to parse the stream of data and to identify whether a subset of the stream of data is missing;
  means for employing the wireless transceiver to send a negative acknowledgment or an acknowledgment if the subset of the stream of data is missing or not missing, respectively; and
  means for employing the wireless transceiver to obtain a retransmission of the data unit having the most recent reply command.

44. At least one processor configured for receiving wireless communication, comprising:
  a module that obtains a stream of data comprising a data unit having a most recent reply command for the stream of data;
  a module that parses the stream of data and identifies whether a subset of the stream of data is missing;
  a module that sends a negative acknowledgment or an acknowledgment if the subset of the stream of data is missing or not missing, respectively; and
  a module that obtains a retransmission of the data unit having the most recent reply command.

45. A computer program product, comprising:
  a non-transitory computer-readable medium, comprising:
  code for causing a computer to obtain a stream of data comprising a data unit having a most recent reply command for the stream of data;
  code for causing the computer to parse the stream of data and to identify whether a subset of the stream of data is missing;
  code for causing the computer to send a negative acknowledgment or an acknowledgment if the subset of the stream of data is missing or not missing, respectively; and
  code for causing the computer to obtain a retransmission of the data unit having the most recent reply command.

* * * * *